United States Patent
Waayers et al.

(10) Patent No.: US 11,301,607 B2
(45) Date of Patent: Apr. 12, 2022

(54) TESTING OF ASYNCHRONOUS RESET LOGIC

(71) Applicant: NXP B.V., Eindhoven (NL)

(72) Inventors: Tom Waayers, Sint Michielsgestel (NL); Johan Corneel Meirlevede, Doorwerth (NL); Paul-Henri Pugliesi-Conti, Hermanville sur Mer (FR); Vincent Chalendard, Antibes (FR); Michael Rodat, Nice (FR)

(73) Assignee: NXP B.V., Eindhoven (NL)

( * ) Notice: Subject to any disclaimer, the term of this patent is extended or adjusted under 35 U.S.C. 154(b) by 308 days.

(21) Appl. No.: 16/718,939

(22) Filed: Dec. 18, 2019

(65) Prior Publication Data

US 2021/0109153 A1  Apr. 15, 2021

(30) Foreign Application Priority Data

Oct. 15, 2019 (EP) .................................. 19306342

(51) Int. Cl.
*G06F 30/333* (2020.01)
*G01R 31/3185* (2006.01)
*G06F 30/35* (2020.01)
*G01R 31/3177* (2006.01)
*G06F 117/02* (2020.01)
*G01R 31/317* (2006.01)

(52) U.S. Cl.
CPC ... *G06F 30/333* (2020.01); *G01R 31/318583* (2013.01); *G06F 30/35* (2020.01); *G01R 31/3177* (2013.01); *G01R 31/31715* (2013.01); *G06F 2117/02* (2020.01)

(58) Field of Classification Search
None
See application file for complete search history.

(56) References Cited

U.S. PATENT DOCUMENTS

| | | | |
|---|---|---|---|
| 7,188,285 B2 * | 3/2007 | Natsume ............ | G01R 31/3172 714/727 |
| 9,213,063 B2 * | 12/2015 | Jindal ............ | G01R 31/318583 |
| 9,297,855 B1 | 3/2016 | Jindal et al. | |
| 2004/0111658 A1 | 6/2004 | Natsume | |
| 2004/0153926 A1 * | 8/2004 | Abdel-Hafez .............................. | G01R 31/318583 714/726 |

OTHER PUBLICATIONS

Jain, S. et al., "Robust asynchronous-reset architecture for scan coverage," EDN Network, Apr. 15, 2015, 7 pages, downloaded from https://www.edn.com/design/integrated-circuit-design/4439203/Robust-asynchronous-reset-architecture-for-scan-coverage.

* cited by examiner

*Primary Examiner* — Leigh M Garbowski

(57) ABSTRACT

Testing of integrated circuitry, wherein the integrated circuitry includes a flip-flop with an asynchronous input, so that during performance of asynchronous scan patterns, glitches are avoided. Combinatorial logic circuitry delivers a local reset signal to the asynchronous input independent of an assertion of an asynchronous global reset signal. A synchronous scan test is performed of delivery of the local reset signal from the combinatorial logic circuitry while masking delivery of any reset signal to the asynchronous input of the flip-flop. An asynchronous scan test is performed of an asynchronous reset of the flip-flop with the asynchronous global reset signal while masking delivery of the local reset signal to the asynchronous input of the flip-flop.

20 Claims, 13 Drawing Sheets

| Mode | Event | Pin tck | Pin se | Pin ad | clk | tcb_se | tcb_async_disable | tcb_local_reset_disable | tcb_reset_obs_enable | ipt_global_init_an | func_local_reset_an |
|---|---|---|---|---|---|---|---|---|---|---|---|
| APPLICATION | - | - | - | - | - | 0 | 0 | 0 | 0 | - | - |
| SCAN | SHIFT | P | 1 | - | P | 1 | 1 | - | - | - | - |
| SCAN | DEAD CYCLE SHIFT | 0 | 1 | - | 0 | 1 | 1 | - | - | F | F |
| SCAN | DEAD CYCLE NORMAL | 0 | 0 | - | 0 O/F | 0 O/F | 1 | - | - | F | F |
| SCAN | NORMAL/CAPTURE | P | 0 | - | P O/F | P O/F | 1 | - | F F | F | F |
| SCAN ASYNC | DEAD CYCLE SHIFT | 0 | 1 | 1 | 0 | 1 | 1 | - | - | O/F | - |
| SCAN ASYNC | DEAD CYCLE NORMAL | 0 | 0 | 1 | 0 O/F | 0 O/F | 1 O/F | 1 | - | O/F | - |
| SCAN ASYNC | NORMAL/CAPTURE | 0 | 0 | 0 | 0 O/F | 0 O/F | 0 O/F | 1 | - | O/F | - |

*FIG. 13*

TESTING OF ASYNCHRONOUS RESET LOGIC

FIELD

The present disclosure relates in general to scan test circuitry that, when incorporated into an integrated circuit, provides improved fault coverage. The present disclosure also relates in general to electronic design automation tools, and, more particularly, to an electronic design automation tool for increasing fault coverage of an integrated circuit.

BACKGROUND

Integrated circuits ("ICs") often include various analog and digital components. Such ICs may have manufacturing defects (e.g., that are caused by dust particle contamination during fabrication), which can cause the ICs to malfunction. Thus, testing the ICs to detect such manufacturing defects is very important. Design-for-test ("DFT") techniques add testability features to the ICs to check for and identify manufacturing defects. DFT enables automatic-test-equipment ("ATE") to execute various fault tests on the IC. The ATEs use test patterns generated by test pattern generators, such as automatic test pattern generators ("ATPG"), pseudo-random pattern generators ("PRPG"), and so on, to detect faults in the ICs. The ICs that undergo such fault tests may be referred to as circuits under test ("CUT").

DFT enables detection of design faults of a CUT using automation, and hence reduces the time and cost required for development and execution of the fault tests. DFT techniques should provide coverage over all the design faults of the CUT. DFT techniques include various fault models such as transition, path delay, and stuck-at fault models. A transition fault model is used to detect a failure of a state transition at a particular element of the CUT that propagates through the CUT within a specific time period. A path delay fault model calculates a sum of delays at each element in a path within the CUT and detects faults by comparing the sum of delays of the path with a delay of a critical path. The stuck-at fault models, such as stuck-at '0' and stuck-at '1' fault models, are used to detect faulty connections between various elements of the CUT that cause a logic of the CUT to be stuck-at a particular logic state, i.e., logic zero or logic one. Based on the source of the test patterns, DFT techniques may be classified as either built-in-self-testing ("BIST") or scan testing. BIST is a self-test mechanism provided to enable self-checking of logic within the CUT.

Generally, scan testing is used for detecting manufacturing faults. The CUT, when subjected to scan testing, operates in two modes—a test mode (also referred to as a shift operation) and a functional mode (also referred to as a capture operation). At the beginning of the scan testing, the CUT is set in the test mode. In the test mode, the CUT may be divided into multiple on-chip logic modules. Each on-chip logic module may be further segmented into scan chains or paths. Digital sequential elements (e.g., flip-flops, latches, and data registers) of a logic module may be connected together to form scan chains or paths. The ATE serially scans a first test pattern generated by an ATPG into the digital logic elements of the scan paths. The CUT is then switched to the functional mode where the primary outputs of the CUT are observed and primary inputs of the CUT are set according to the functional requirement of the design of the CUT for one or more cycles of a clock signal of the CUT. The CUT is then switched back to the test mode and outputs of the scan paths are observed in each clock cycle. The ATE then loads a second test pattern into the scan paths when the previous test pattern is shifted out and compared within a test instrument with previously determined/calculated scan output values. The process may be repeated until required fault coverage of the CUT is met. The ATPG may use a gate-level representation of a netlist of the CUT to generate the test patterns and hence, the test patterns are deterministic.

Furthermore, scan test circuits include scan flip-flops, where a plurality of such scan flip-flops may be chained together to operate as a shift register. A challenge faced in scan testing is designing test data to provide high fault coverage, that is, to detect a high percentage of targeted faults in the combinatorial circuit (e.g., transition, path delay, and stuck-at faults). The challenge is made more difficult by the presence of flip-flops with asynchronous resets, which may corrupt the operation of combinatorial circuit elements during a scan test.

Integrated circuits typically use asynchronous set/resets to set the value of sequential elements (e.g., flip-flops) without depending on any clock pulses. This logic, however, requires special handling during scan based testing of the device. Also, the logic associated with implementation of asynchronous set/resets may constitute 2-4% of the total faults in a design CUT. With growing focus on high test-coverage and zero Defective Parts per Million ("DPPM"), especially for critical applications like automotive and medical devices, it is important to thoroughly test such faults to ensure overall system robustness.

Flip-flops with asynchronous reset terminals pose a challenge during the scan test process. Some scan test circuits generate an internal reset signal, which must be held in the inactive state during the scan shift sequence. Some of the scan test circuits also receive an external reset signal, which is held inactive during the scan shift sequence, and may be controlled arbitrarily for test purposes during the scan capture sequence.

In IC designs with multiple, cascaded asynchronous reset signals, glitches could occur on asynchronous reset paths. In the worst case, simulations of asynchronous scan patterns may pass, but errors will be later detected on the CUT during production, leading to yield loss. These asynchronous scan patterns target faults on asynchronous reset signals, that is, both the faults in logic that generates this reset, and faults in the receiving (re)settable flip-flop.

"Glitches" are a result of circuitry acting in unpredictable ways (which can be dependent upon placement and routing of certain circuit elements), which may lead to a system failure. Glitches can result from the occurrence of metastability. Metastability in electronics is the ability of a digital electronics system to persist for an unbounded time in an unstable equilibrium or metastable state. In digital logic circuits, a digital signal is required to be within certain voltage or current limits to represent a '0' or '1' logic level for correct circuit operation; if the signal is within a forbidden intermediate range, it may cause faulty behavior in logic gates the signal is applied to. In metastable states, the circuit may be unable to settle into a stable '0' or '1' logic level within the time required for proper circuit operation.

During performance of asynchronous scan patterns, glitches can occur because multiple reset sources are enabled (in the capture cycle of a scan test). These glitches (which cannot be prevented in state of the art design synthesis automation) can degrade test robustness and consequently negatively impact the product quality of the subsequently manufactured integrated circuit chips.

BRIEF DESCRIPTION OF THE DRAWINGS

FIG. 13 illustrates a table showing modes of operation pertaining to the various test circuitry disclosed herein.

DETAILED DESCRIPTION

To meet demanding quality levels for integrated circuits, there is a desire for obtaining extremely high fault coverage during performance of structural scan tests of digital logic. However, structural tests of asynchronous reset signals and the logic circuitry that drives these typically suffer from glitches that degrade test robustness and consequently decrease testability/coverage. Aspects of the present disclosure provide on-chip (e.g., design for test) structures and techniques that provide enhanced coverage for such structural tests of asynchronous reset signals of flip-flops as well as the logic circuitry driving these signals to the flip-flops, while at the same time preventing glitches from degrading the tests. Additionally, aspects of the present disclosure are well suited for automated test point insertion in design synthesis.

Embodiments of the present disclosure are applicable to any type of flip-flop or other sequential element implemented within integrated circuitry that has one or more asynchronous inputs. Asynchronous inputs on a flip-flop have control over the outputs (Q and not-Q) regardless of clock input status. These inputs may be referred to as the set (or preset) and reset (or clear) inputs. The set input drives the flip-flop to a set state, while the reset input drives it the flip-flop to a reset state. Though certain embodiments are described with respect to flip-flops having a reset input, such embodiments are also applicable to flip-flops having a set input. As such, whether a flip-flop has a reset or set input, certain embodiments of the present disclosure will be described as such asynchronous inputs receiving a "reset signal" from a "reset source" for the sake of simplicity. In this disclosure, the terms "reset signal" and "asynchronous reset signal" should be understood to cover any signal that forces (resets) the output of a flip-flop to a predetermined state, regardless of its present internal state or present data input.

Embodiments of the present disclosure are described with respect to functional flip-flops that operate on data within integrated circuitry, wherein such flip-flops are synchronously clocked (edge sensitive) with a synchronous clock signal ("clk"), wherein the asynchronous inputs are level sensitive terminals. The figures illustrate D-type flip-flops for the sake of simplicity. The D-type flip-flops represent scan flip-flops capable of scan muxing, scan enable control, and connections that form a scan chain with other scan flip-flops.

In this disclosure, embodiments are described in which an effect or delivery of a particular signal is disabled, such as through the use of a logic circuit. This may also be referred to as a masking of the particular signal.

Figure 1:
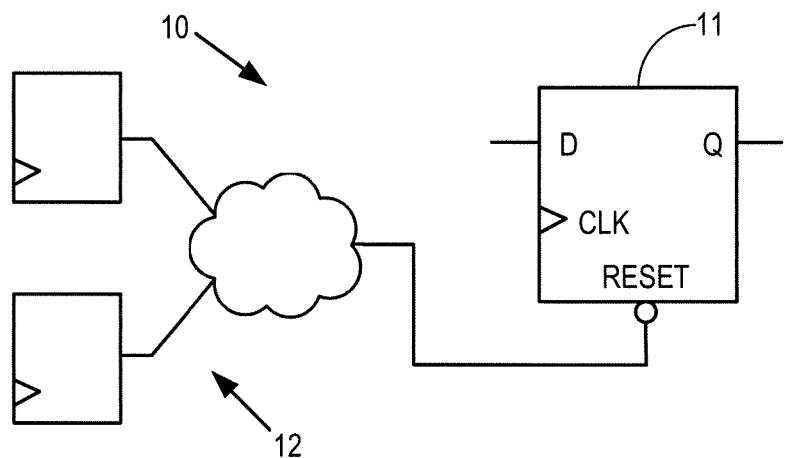
FIG. 1 illustrates a functional reset cone driving an asynchronous reset of a flip-flop.

FIG. 1 illustrates an exemplary simplified block diagram of a circuit 10 commonly implemented within integrated circuitry whereby the asynchronous input of a flip-flop 11 (shown for the sake of simplicity as the RESET input, which is asserted with a logic low value) is driven with an asynchronous reset signal by a functional cone 12. Such a functional cone 12 may include various levels of combinatorial logic circuits (schematically represented by the "cloud" symbol) that provide a local reset signal for the asynchronous reset input of the flip-flop 11. The functional cone 12 may represent logic circuitry that is configured to serve asynchronous set/reset operations (which may be independent of assertion of any global reset signal). For example, the local reset signal may be generated from combinational decoding of other sequential cells and/or decoding logic of primary inputs. In such a case, the other sequential cells may refer to further flip-flops that provide access to test stimuli values during a synchronous scan test. Such a functional cone 12 also demonstrates how in certain embodiments within integrated circuitry, cascaded asynchronous reset signals may be implemented for the asynchronous reset input of a flip-flop 11. For example, in such embodiments, the functional cone 12 includes combinatorial logic circuits that produce the local reset signal from a plurality of cascaded asynchronous reset signals. Regardless of the specific configuration of the functional cone 12, it is the occurrence of glitches within such a functional cone 12 that is a subject of embodiments of the present disclosure.

Figure 2:
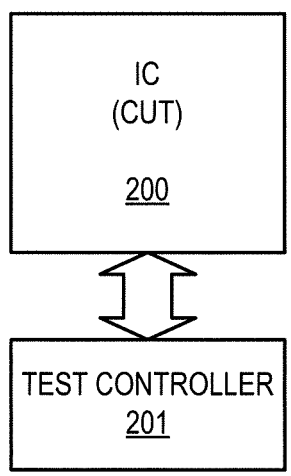
FIG. 2 illustrates an exemplary simplified block diagram of testing of integrated circuitry in accordance with embodiments of the present disclosure.

FIG. 2 illustrates an exemplary simplified block diagram showing how an integrated circuit ("IC") 200, or any collection of integrated circuitry, can be coupled to a test controller 201 for testing various circuitry within the integrated circuit 200. The integrated circuitry being tested may be referred to as the circuit under test ("CUT"). The test controller 201 may implement automatic-test-equipment ("ATE") to execute various fault tests on the IC 200. The ATEs may use test patterns generated by test pattern generators, such as automatic test pattern generators ("ATPG"), pseudo-random pattern generators ("PRPG"), and so on, to detect faults in the IC 200. In accordance with embodiments of the present disclosure, the IC 200 is implemented with one or more of the various test circuitry (also referred to herein as "scan test circuits") disclosed herein. The IC 200 may include at least one test control block ("TCB") (not shown) configured to interface with the test controller 201 so that test control signals (also referred to simply as "test signals"), test patterns, and observed test results can be communicated between the test controller 201 and test circuitry implemented within the IC 200. IC 200 may include at least one scan interface (e.g., with input/output terminals scan in, scan out, scan enable, and scan clk), such as within the TCB, for scan chain access.

In FIGS. 3-13, signals identified with a label beginning with "tcb_" represent a selectively generated test signal, which may originate from the test controller 201 via the test control block (or may also drive the test control block). Signals identified with a label beginning with "ipt_" may originate from global architecture (e.g., circuitry implemented on a global manner within the IC 200) or may be designed to implement specific conditions for testing of the CUT. In accordance with embodiments of the present disclosure, such signals represent asynchronous global set or reset signals implemented within the IC 200 for asynchronously setting or resetting specified logic circuits (e.g., flip-flops) to a known state. The circuitry for selectively delivering such an asynchronous global set or reset signal is generally implemented to deliver such a signal in a global manner throughout the IC 200. Signals identified with a label beginning with "func_" may originate from functional logic (e.g., a functional cone 12) without further specific conditions for testing of the CUT. Ports in the various flip-flops are identified with R for an asynchronous reset, S for an asynchronous set, C1 for clock, 1D for a synchronous data input, and Q for a synchronous data output (note that the output Q may change asynchronously as well upon an occurrence of set or reset events). Other ports of the flip-flops are not shown for the sake of simplicity.

Figure 3:
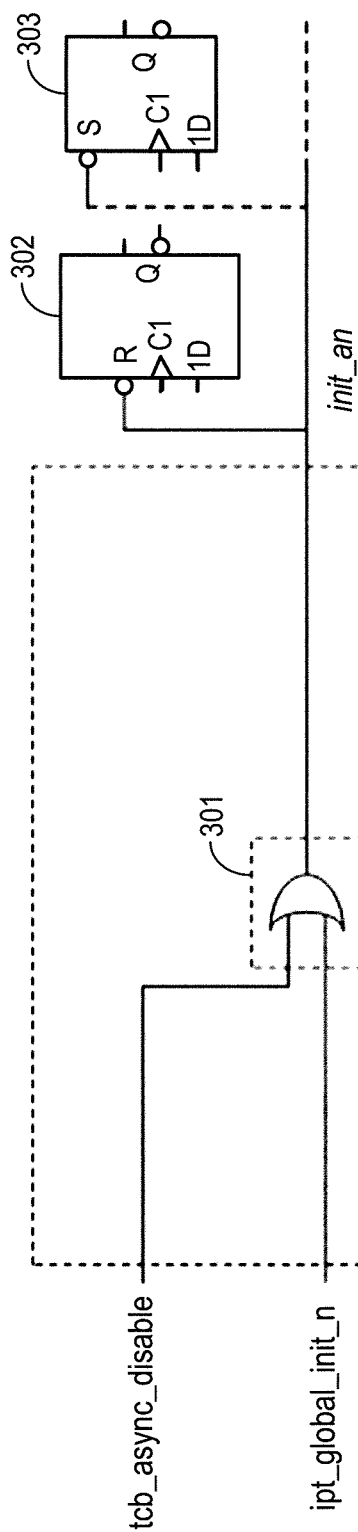
FIG. 3 illustrates a configuration of one or more flip-flops that have only set and/or reset sources that are independent of the scan clock.

FIG. 3 illustrates exemplary test circuitry in which one or more flip-flops 302 . . . 303 have their reset (R) and/or set (S) inputs driven only by reset sources that are independent of the scan clock signal (e.g., an asynchronous reset or set signal provided by a dedicated reset pin or a power-on-reset ("POR") circuit implemented within the IC 200). A global asynchronous reset signal (identified as "ipt_global_init_n") is received by a logic OR gate 301, which also receives a signal configured to disable (identified as "tcb_async_disable") the effect of (i.e., mask via the logic OR gate 301) the global asynchronous reset signal to the one or more flip-flops 302 . . . 303, such as for testing the asynchronous input(s) of the one or more flip-flops 302 . . . 303 under ATPG control. The output of the logic OR gate 301 (identified as "init_an") drives the asynchronous input(s) of the one or more flip-flops 302 . . . 303.

FIG. 3 is provided to show a distinction between instances where a flip-flop has an asynchronous input driven only by reset sources that are independent of a scan clock signal, such as a global asynchronous reset signal, and those instances where the asynchronous input is driven additionally by some sort of locally (internally) generated reset signal, such as illustrated in FIG. 1 where the local reset signal is provided by a functional cone 12. Without such a local reset signal being generated, there is no concern of cascading of asynchronous reset signals, and therefore no consequential risk of glitches. In contrast to FIG. 3, embodiments of the present disclosure described herein are configured for testing one or more flip-flops in which their asynchronous input(s) are driven by one or more local reset sources.

For the sake of simplicity, FIGS. 4-7 and 9-12 are illustrated without showing a functional cone or other local reset source circuitry providing the local reset signal (e.g., see the functional cone 12 of FIG. 1). Instead, FIGS. 4-7 and 9-12 illustrate test circuitry receiving a local reset signal from such a local reset source in which the local reset signal is identified as "func_local_rst_set_n" in the case where such a local reset signal may be configured to drive the reset and/or set input of one or more flip-flops, "func_local_set_n" in the case where such a local reset signal may be configured to drive the set input of one or more flip-flops, or "func_local_rst_n" in the case where such a local reset signal may be configured to drive the reset input of one or more flip-flops. The test circuitry disclosed herein with respect to FIGS. 4-7 and 9-12 may also be referred to as a "scan test circuit."

Additionally, FIGS. 4-7 and 9-12 are illustrated showing a global reset signal that may be provided by any type of one or more well-known reset sources that are independent of the scan clock signal (e.g., an asynchronous reset or set signal provided by dedicated reset pins or a power on reset ("POR") circuit). However, for the sake of simplicity, such global reset sources are not illustrated. Instead, FIGS. 4-7 and 9-12 illustrate test circuitry receiving a global reset signal from such a global reset source in which the global reset signal is identified as "ipt_global_init_n" in the case where such a global reset signal may be configured to drive the reset and/or set input of one or more flip-flops, "ipt_global_init_set_n" in the case where such a global reset signal may be configured to drive the set input of one or more flip-flops, or "ipt_global_init_rst_n" in the case where such a global reset signal may be configured to drive the reset input of one or more flip-flops.

Figure 4:
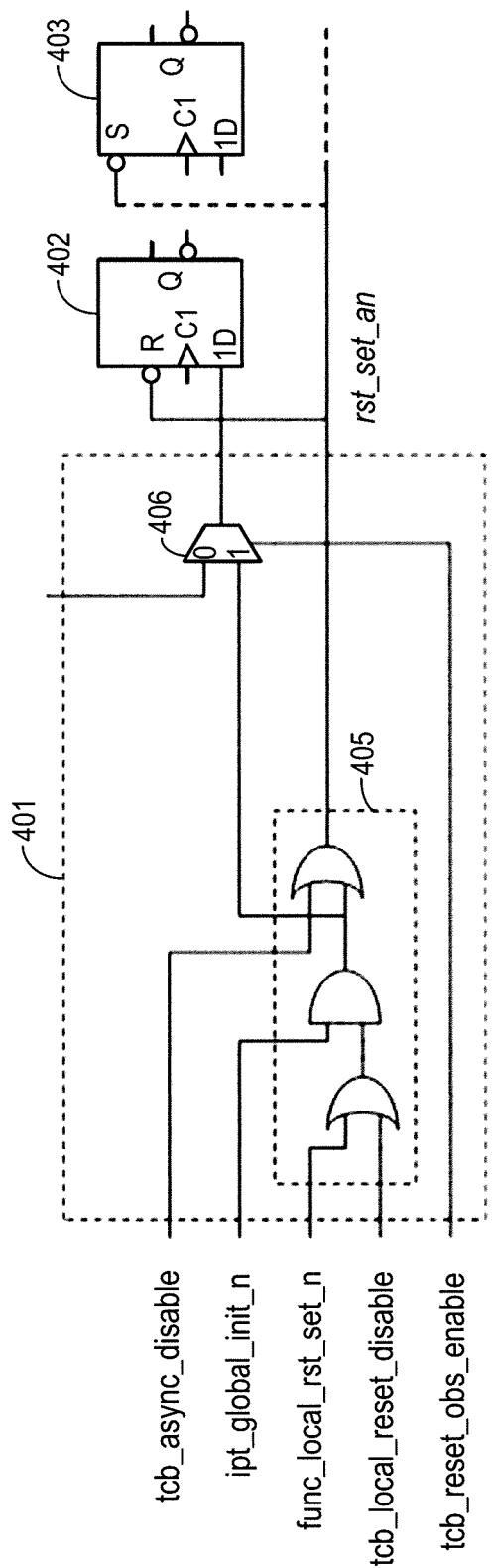
FIG. 4 illustrates test circuitry utilizing an OR-AND-OR logic circuit together with a multiplexer that provides an observation path for test via reuse of a functional flip-flop.

FIG. 4 illustrates an embodiment of the present disclosure similar to the embodiment of FIG. 3 except that the one or more flip-flops 402 . . . 403 have reset and/or set inputs that can be selectively driven by a local reset source (providing a local reset signal identified as "func_local_rst_set_n") or a global reset source (providing a global reset signal identified as "ipt_global_init_n"). The flip-flops 402 . . . 403 may be functional flip-flops implemented within the IC 200. In this embodiment, the test circuitry 401 is implemented in accordance with embodiments of the present disclosure.

The test circuitry 401 includes an OR-AND-OR logic circuit 405 in combination with a multiplexer 406. The first logic OR gate of the OR-AND-OR logic circuit 405 receives the local reset signal "func_local_rst_set_n" and a local reset disable signal (identified as "tcb_local_reset_disable"). The local reset disable signal may be a selectively generated test signal configured to disable the effect of the local reset signal. The local reset disable signal may be generated by a test control block implemented within the IC 200.

The output of the first logic OR gate is received by an input of the logic AND gate of the OR-AND-OR logic circuit 405, which also receives the global reset signal. The second logic OR gate of the OR-AND-OR logic circuit 405 receives the output of the logic AND gate along with a global reset disable signal (identified as "tcb_async_disable") configured to selectively disable the effect of the global reset signal. The global reset disable signal may be generated by a test control block implemented within the IC 200.

The output of the second logic OR gate (identified as "rst_set_an") is coupled to the reset or set asynchronous input(s) of the one or more flip-flops 402 . . . 403. For testing the logic circuitry that generates the local reset signal (e.g., a functional cone 12), an observe path is implemented by coupling the output of the logic AND gate to one of the inputs of the multiplexer 406. The other input of the multiplexer 406 may receive a data input signal from other circuitry within the integrated circuit 200. The output of the multiplexer 406 is coupled to a data input of one of the one or more flip-flops 402 . . . 403. The multiplexer 406 may be configured to select between the two inputs by a reset observe enable signal (identified as "tcb_reset_obs_enable"), which may be selectively generated by the test control block implemented within the IC 200. For example, as further described herein, the tcb_reset_obs_enable may be selectively asserted as a logic 0 signal during a mode of operation in which the one or more flip-flops 402 . . . 403 are functioning in a mission/application mode for operation of an application within the integrated circuit 200 (e.g., see the APPLICATION Mode in Table 1300 of FIG. 13). Test circuitry implemented within the IC 200 may provide an observation point at a data output (Q) of one of the one or more flip-flops 402 . . . 403, and couple that observation point to the test control block implemented within the IC 200. For example, the IC 200 may be configured so that the data output of one of the one or more flip-flops 402 . . . 403 is coupled in a scan chain as is well-known in the art for observing the output of the flip-flop during a scan operation. With respect to the embodiment disclosed by FIG. 4, such a scan operation may involve assertion of the tcb_reset_obs_enable signal to select the observe path, performance of a scan capture operation to store the observed result in the flip-flop, and performance of a scan shift operation to transport the observed result from the Q output of the flip-flop via the scan chain to the test controller 201 by way of the test control block implemented within the IC 200. Note that signals and flip-flop terminals related to performance of such scan chain operations are not shown for the sake of simplicity, but are well-known in the art.

Figure 5:
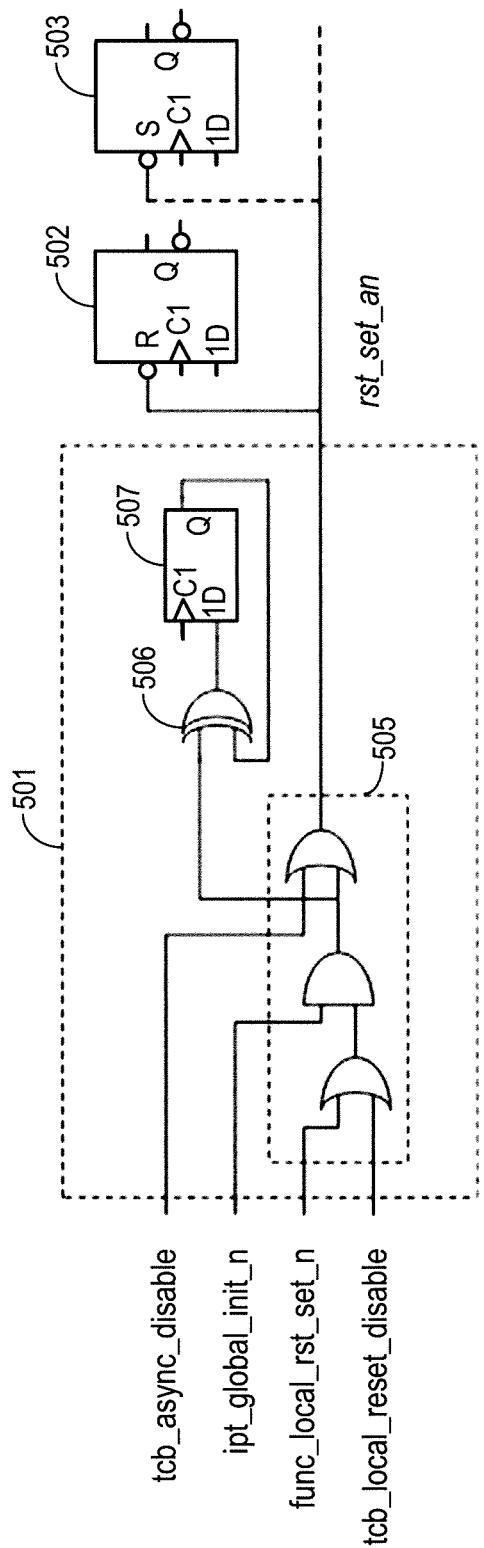
FIG. 5 illustrates test circuitry utilizing an OR-AND-OR logic circuit with an observe flip-flop implemented for testing.

FIG. 5 illustrates an embodiment of the present disclosure that is configured similarly to the configuration of FIG. 4. The flip-flops 502 . . . 503 may be similar to the flip-flops 402 . . . 403. The one or more flip-flops 502 . . . 503 may have reset and/or set inputs, which can be selectively driven by a local reset source (providing a local reset signal identified as "func_local_rst_set_n") or a global reset source (providing a global reset signal identified as "ipt_global_init_n"). The test circuitry 501 may be implemented as an alternative to the test circuitry 401. The OR-AND-OR logic circuit 505 may be configured in a similar manner as the OR-AND-OR logic circuit 405. The first logic OR gate of the OR-AND-OR logic circuit 505 receives the local reset signal "func_local_rst_set_n" and a local reset disable signal (identified as "tcb_local_reset_disable"). The local reset disable signal may be a selectively generated test signal configured to disable the effect of the local reset signal. The local reset disable signal may be generated by the test control block implemented within the IC 200.

The output of the first logic OR gate is received by an input of the logic AND gate of the OR-AND-OR logic circuit 505, which also receives the global reset signal. The second logic OR gate of the OR-AND-OR logic circuit 505 receives the output of the logic AND gate along with a global reset disable signal (identified as "tcb_async_disable") configured to selectively disable the effect of the global reset signal. The global reset disable signal may be generated by the test control block implemented within the IC 200. The output of the second logic OR gate (identified as "rst_set_an") is coupled to the reset or set asynchronous inputs of the one or more flip-flops 502 . . . 503.

For testing the logic circuitry that generates the local reset signal (e.g., a functional cone 12), an observe path is implemented by coupling the output of the logic AND gate to an observe flip-flop 507 implemented to observe the functioning of the local reset signal via an output of the observe flip-flop 507. An optional logic XOR gate 506 may be implemented between the output of the logic AND gate and the observe flip-flop 507 with feedback of the output of the observe flip-flop 507 to an input of the logic XOR gate 506.

Figure 6:
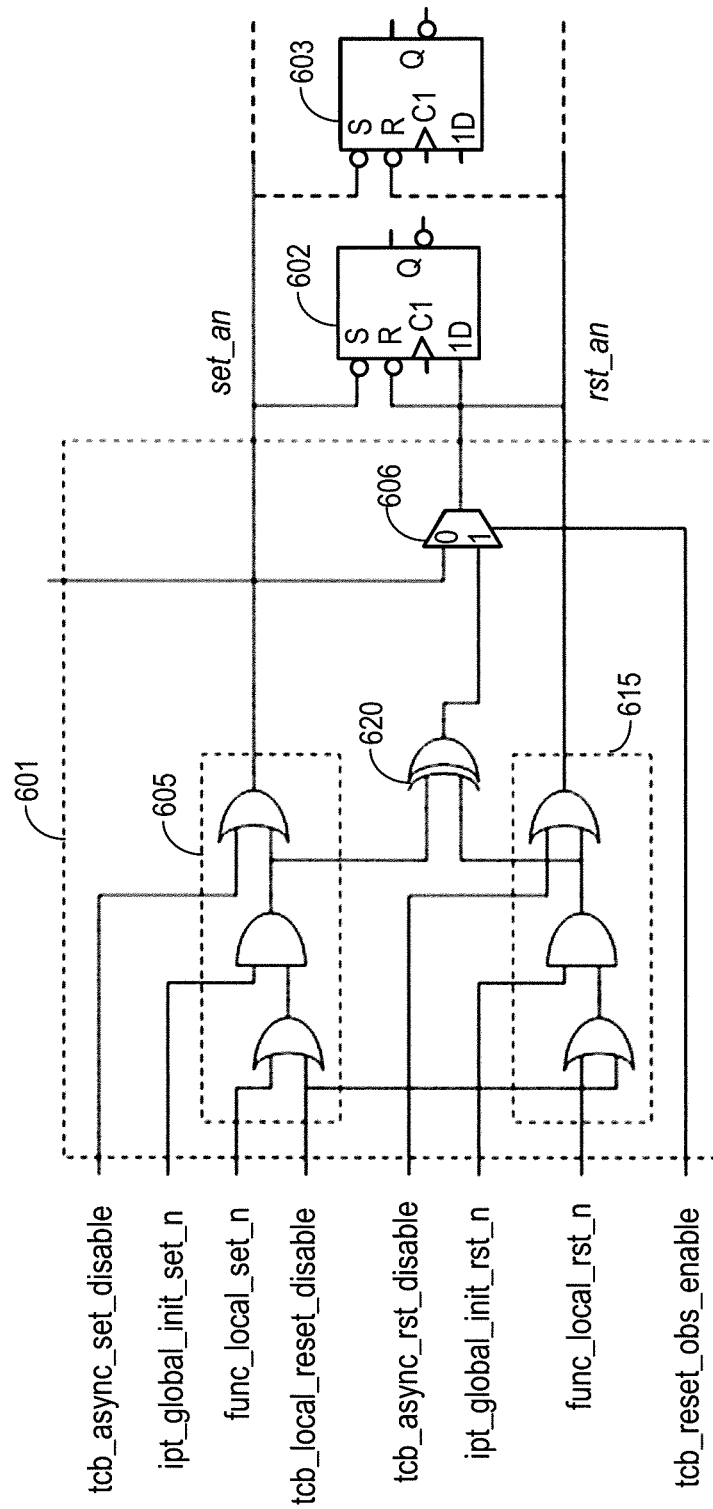
FIG. 6 illustrates test circuitry similar to the circuitry of FIG. 4 for use when a flip-flop has both set and reset asynchronous inputs.

FIG. 6 illustrates test circuitry 601 for implementation when one or more flip-flops 602 . . . 603 have both set and reset asynchronous inputs, wherein at least one of these is coupled to a local reset source. The flip-flops 602 . . . 603 may be functional flip-flops implemented within the IC 200. The test circuitry 601 is similar to the test circuitry 401 except that it may utilize two OR-AND-OR logic circuits, wherein the OR-AND-OR logic circuit 605 is implemented for the set input(s) of the one or more flip-flops 602 . . . 603, and the OR-AND-OR logic circuit 615 is implemented for the reset input(s) of the one or more flip-flops 602 . . . 603.

The one or more flip-flops 602 . . . 603 having set inputs may be selectively driven by a local reset source (providing a local set signal identified as "func_local_set_n") or a global reset source (providing a global set signal identified as "ipt_global_init_set_n"). The first logic OR gate of the OR-AND-OR logic circuit 605 receives the local reset signal "func_local_set_n" and a local reset disable signal (identified as "tcb_local_reset_disable"). The local reset disable signal may be a selectively generated test signal configured to disable the effect of the local reset signal, func_local_set_n. The local reset disable signal may be generated by the test control block implemented within the IC 200. The output of the first logic OR gate is received by an input of the logic AND gate of the OR-AND-OR logic circuit 605, which also receives the global set signal, ipt_global_init_set_n. The second logic OR gate of the OR-AND-OR logic circuit 605 receives the output of the logic AND gate along with a global reset disable signal (identified as "tcb_async_set_disable") configured to selectively disable the effect of the global set signal. The global reset disable signal may be generated by the test control block implemented within the IC 200.

The one or more flip-flops 602 . . . 603 having reset inputs may be selectively driven by a local reset source (providing a local reset signal identified as "func_local_rst_n") or a global reset source (providing a global reset signal identified as "ipt_global_init_rst_n"). The first logic OR gate of the OR-AND-OR logic circuit 615 receives the local reset signal "func_local_rst_n" and a local reset disable signal (identified as "tcb_local_reset_disable"). The local reset disable signal may be a selectively generated test signal configured to disable the effect of the local reset signal, func_local_set_n. The output of the first logic OR gate is received by an input of the logic AND gate of the OR-AND-OR logic circuit 615, which also receives the global reset signal, ipt_global_init_rst_n. The second logic OR gate of the OR-AND-OR logic circuit 615 receives the output of the logic AND gate along with a global reset disable signal (identified as "tcb_async_rst_disable") configured to selectively disable the effect of the global reset signal, ipt_global_init_rst_n. The global reset disable signal may be generated by the test control block implemented within the IC

200. The output of the second logic OR gate of the OR-AND-OR logic circuit 605 (identified as "set_an") is coupled to the set asynchronous inputs of the one or more flip-flops 602 . . . 603. The output of the second logic OR gate of the OR-AND-OR logic circuit 615 (identified as "rst_an") is coupled to the reset asynchronous inputs of the one or more flip-flops 602 . . . 603.

For testing the logic circuits that generate the local set and reset signals (e.g., one or more functional cones 12), an observe path is implemented with a multiplexer 606, which may operate in a similar manner as the multiplexer 406, and a coupling of the outputs of the logic AND gate of the OR-AND-OR logic circuit 605 and the logic AND gate of the OR-AND-OR logic circuit 615 to an XOR gate 620, which has an output supplying an input to the multiplexer 606. The other input to the multiplexer 606 may receive a functional data input signal from other circuitry within the integrated circuit 200. The output of the multiplexer 606 is coupled to a data input of one of the one or more flip-flops 602 . . . 603. The multiplexer 606 may be configured to select between the two inputs by a reset observe enable signal (identified as "tcb_reset_obs_enable"), which may be selectively generated by the test control block implemented within the IC 200. For example, as further described herein, the tcb_reset_obs_enable may be selectively asserted as a logic 0 signal during a mode of operation in which the one or more flip-flops 602 . . . 603 are functioning in a mission/application mode for operation of an application within the integrated circuit 200 (e.g., see the APPLICATION Mode in Table 1300 of FIG. 13).

Figure 7:
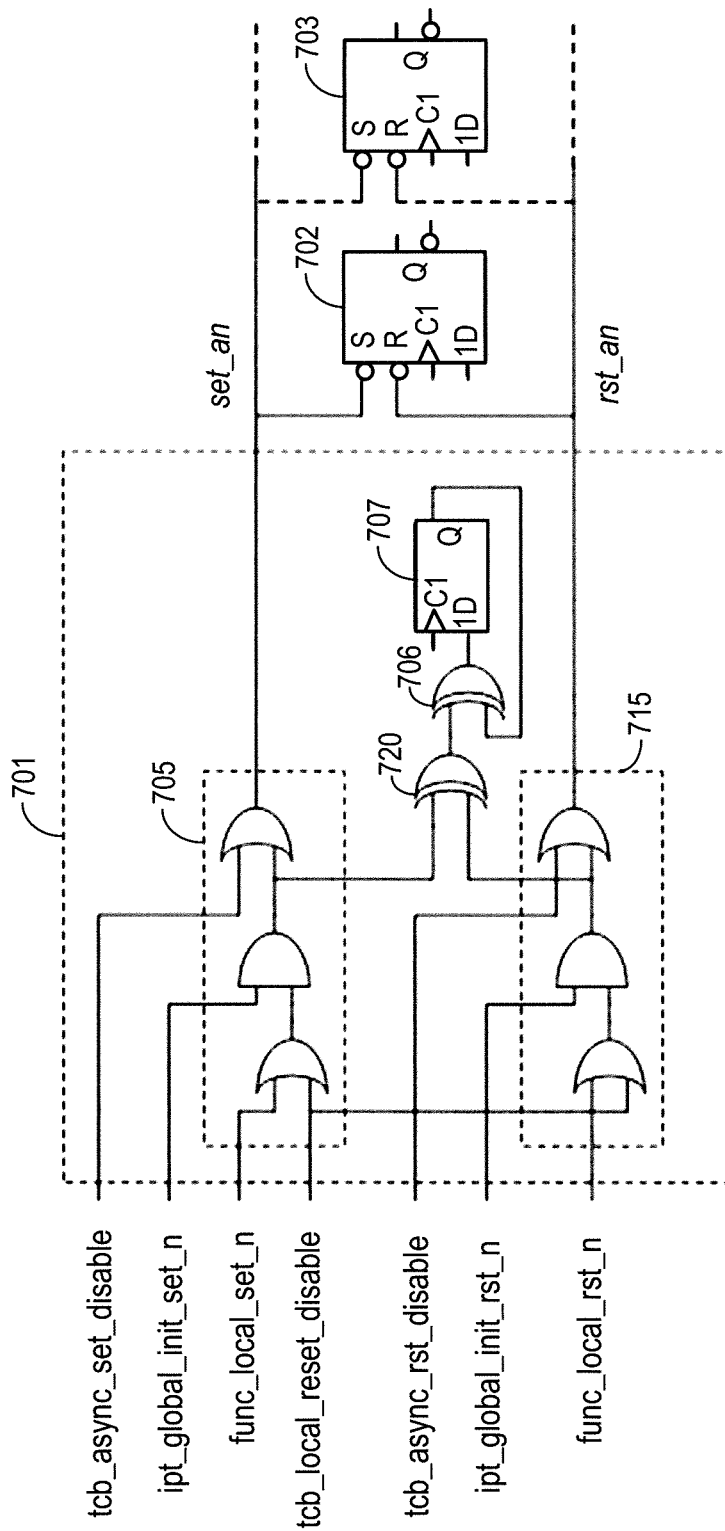
FIG. 7 illustrates test circuitry similar to the circuitry of FIG. 5 for use when a flip-flop has both set and reset asynchronous inputs.

FIG. 7 illustrates an embodiment of the present disclosure that is configured similarly to the configuration of FIG. 6. The flip-flops 702 . . . 703 may be similar to the flip-flops 602 . . . 603 having both set and reset asynchronous inputs, wherein at least one of these is coupled to a local reset source. The flip-flops 702 . . . 703 may be functional flip-flops implemented within the IC 200. The one or more flip-flops 702 . . . 703 having set inputs may be selectively driven by a local reset source (providing a local set signal identified as "func_local_set_n") or a global reset source (providing a global set signal identified as "ipt_global_init_set_n"). The first logic OR gate of the OR-AND-OR logic circuit 705 receives the local reset signal "func_local_set_n" and a local reset disable signal (identified as "tcb_local_reset_disable"). The local reset disable signal may be a selectively generated test signal configured to disable the effect of the local reset signal, func_local_set_n. The local reset disable signal may be generated by the test control block implemented within the IC 200. The output of the first logic OR gate is received by an input of the logic AND gate of the OR-AND-OR logic circuit 705, which also receives the global set signal, ipt_global_init_set_n. The second logic OR gate of the OR-AND-OR logic circuit 705 receives the output of the logic AND gate along with a global reset disable signal (identified as "tcb_async_set_disable") configured to selectively disable the effect of the global set signal. The global reset disable signal may be generated by the test control block implemented within the IC 200.

The one or more flip-flops 702 . . . 703 having reset inputs may be selectively driven by a local reset source (providing a local reset signal identified as "func_local_rst_n") or a global reset source (providing a global reset signal identified as "ipt_global_init_rst_n"). The first logic OR gate of the OR-AND-OR logic circuit 715 receives the local reset signal "func_local_rst_n" and a local reset disable signal (identified as "tcb_local_reset_disable"). The local reset disable signal may be a selectively generated test signal configured to disable the effect of the local reset signal, func_local_rst_n. The output of the first logic OR gate is received by an input of the logic AND gate of the OR-AND-OR logic circuit 715, which also receives the global reset signal, ipt_global_init_rst_n. The second logic OR gate of the OR-AND-OR logic circuit 715 receives the output of the logic AND gate along with a global reset disable signal (identified as "tcb_async_rst_disable") configured to selectively disable the effect of the global reset signal, ipt_global_init_rst_n. The global reset disable signal may be generated by the test control block implemented within the IC 200. The output of the second logic OR gate of the OR-AND-OR logic circuit 705 (identified as "set_an") is coupled to the set asynchronous inputs of the one or more flip-flops 702 . . . 703. The output of the second logic OR gate of the OR-AND-OR logic circuit 715 (identified as "rst_an") is coupled to the reset asynchronous inputs of the one or more flip-flops 702 . . . 703.

For testing the logic circuits that generate the local set and reset signals (e.g., one or more functional cones 12), an observe path is implemented by coupling the outputs of the logic AND gate of the OR-AND-OR logic circuit 705 and the logic AND gate of the OR-AND-OR logic circuit 715 via an XOR gate 720 to an observe flip-flop 707 implemented to observe the functioning of the local set and reset signals via an output of the observe flip-flop 707. An optional logic XOR gate 706 may be implemented between the output of the XOR gate 720 and the observe flip-flop 707 with feedback of the output of the observe flip-flop 707 to an input of the logic XOR gate 706.

Figure 8:
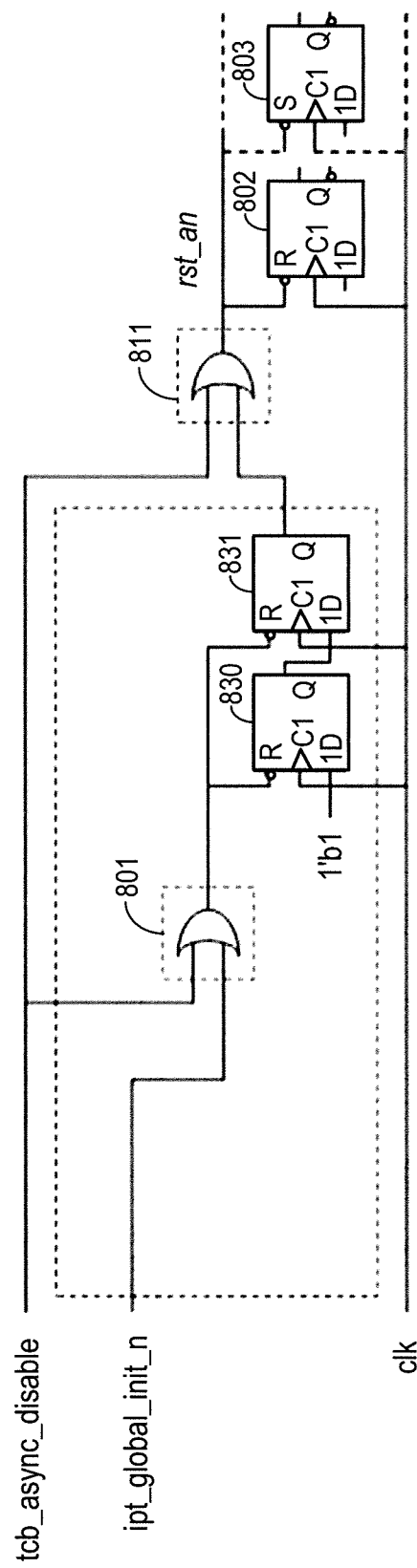
FIG. 8 illustrates a configuration of one or more flip-flops that have only set and/or asynchronous reset inputs that are independent of the scan clock for implementation with a reset synchronizer.

FIG. 8 illustrates test circuitry in which one or more flip-flops 802 . . . 803 have their reset (R) and/or set (S) inputs driven, via a reset synchronizer (asynchronous reset, synchronous deassertion), only by reset sources that are independent of the scan clock signal (e.g., an asynchronous reset or set signal provided by dedicated reset pins or a power on reset ("POR") circuit). Without such a local reset signal being generated (e.g., by a functional cone 12), there is no concern of cascading of asynchronous reset signals, and therefore no consequential risk of glitches. The reset synchronizer includes the flip-flops 830 and 831 configured to asynchronously transfer the reset signal, and then synchronously deassert it. Logic OR gates 801 and 811 are used during a scan test operation to disable (mask) the reset path. A global reset signal (identified as "ipt_global_init_n") is received by a logic OR gate 811, which also receives a signal configured to disable, or mask, (identified as "tcb_async_disable") the effect of the global reset to the one or more flip-flops 802 . . . 803, such as for testing the asynchronous input(s) of the one or more flip-flops 802 . . . 803 under ATPG control. The output (identified as "rst_an") of the logic OR gate 811 drives the asynchronous input(s) of the one or more flip-flops 802 . . . 803.

In contrast to FIG. 8, embodiments of the present disclosure described herein are configured for testing flip-flops in which their asynchronous inputs are driven by one or more local reset sources.

Figure 9:
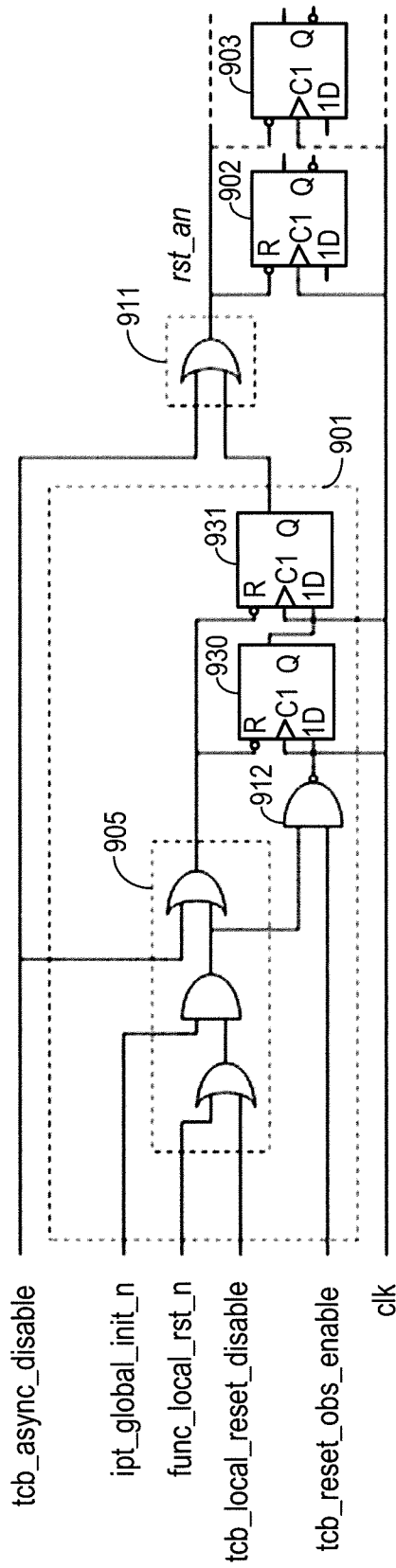
FIG. 9 illustrates test circuitry utilizing an OR-AND-OR logic circuit for implementation with a reset synchronizer with an observation path for test via reuse of a functional flip-flop.

FIG. 9 illustrates an embodiment of the present disclosure similar to the embodiment of FIG. 8 except that the one or more flip-flops 902 . . . 903 have reset and/or set inputs that can be selectively driven by a local reset source (providing a local reset signal identified as "func_local_rst_n") or a global reset source (providing a global reset signal identified as "ipt_global_init_n"). The flip-flops 902 . . . 903 may be functional flip-flops implemented within the IC 200. A reset synchronizer includes the flip-flops 930 and 931 configured to drive the reset or set inputs of one or more of the flip-flops 902 . . . 903 via a logic OR gate 911. The output of the logic OR gate 911 (identified as "rst_an") is coupled to the reset or set asynchronous inputs of the one or more flip-flops 902 . . . 903. In this embodiment, test circuitry 901 is incorporated with the reset synchronizer in accordance with embodiments of the present disclosure.

The test circuitry 901 includes an OR-AND-OR logic circuit 905 in combination with a logic NAND gate 912 coupled to the reset synchronizer. The first logic OR gate of the OR-AND-OR logic circuit 905 receives the local reset signal "func_local_rst_n" and a local reset disable signal (identified as "tcb_local_reset_disable"). The local reset disable signal may be a selectively generated test signal configured to disable the effect of the local reset signal. The local reset disable signal may be generated by the test control block implemented within the IC 200. The output of the first logic OR gate is received by an input of the logic AND gate of the OR-AND-OR logic circuit 905, which also receives the global reset signal. The second logic OR gate of the OR-AND-OR logic circuit 905 receives the output of the logic AND gate along with a global reset disable signal (identified as "tcb_async_disable") configured to selectively disable the effect of the global reset signal. The global reset disable signal may be generated by the test control block implemented within the IC 200.

For testing the logic circuitry that generates the local reset signal (e.g., a functional cone 12), an observe path is implemented by coupling the output of the logic AND gate to one of the inputs to the logic NAND gate 912. The other input to the logic NAND gate 912 receives a reset observe enable signal (identified as "tcb_reset_obs_enable"), which may be selectively generated by the test control block implemented within the IC 200. The output of the logic NAND gate 912 is coupled to a data input of the flip-flop 930 of the reset synchronizer. For example, as further described herein, the tcb_reset_obs_enable may be selectively asserted as a logic 0 signal during a mode of operation in which the one or more flip-flops 902 . . . 903 and 930 . . . 931 are functioning in a mission/application mode for operation of an application within the integrated circuit 200 200 (e.g., see the APPLICATION Mode in Table 1300 of FIG. 13). Test circuitry implemented within the IC 200 may provide an observation point at a data output of the flip-flop 930, and couple that observation point to the test control block implemented within the IC 200.

Figure 10:
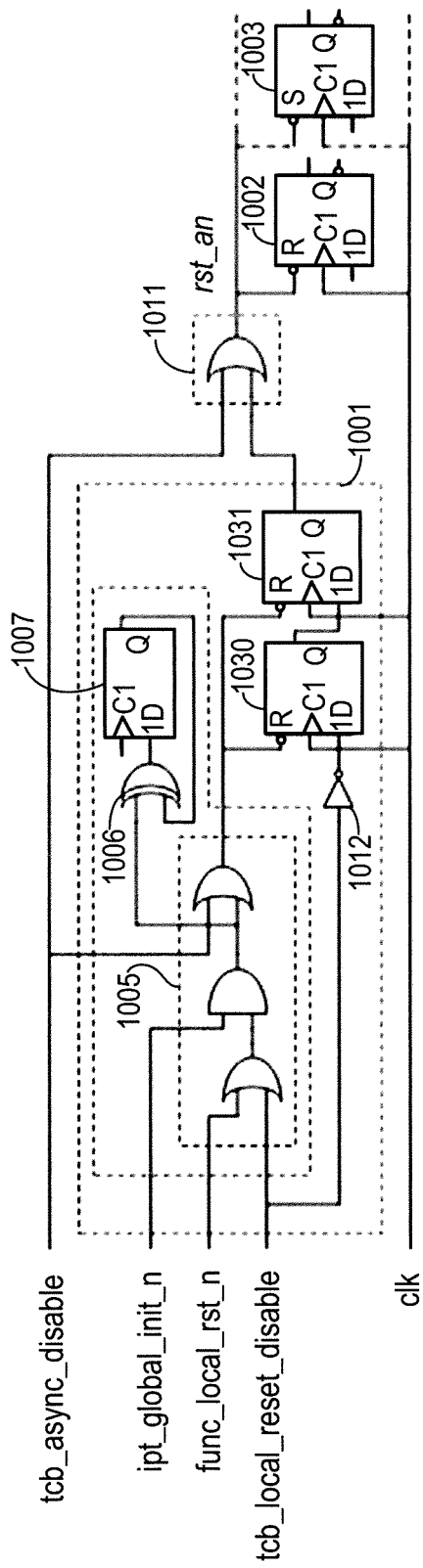
FIG. 10 illustrates test circuitry utilizing an OR-AND-OR logic circuit for implementation with a reset synchronizer with an observe flip-flop implemented for testing.

FIG. 10 illustrates an embodiment of the present disclosure that is configured similarly to the configuration of FIG. 9. The test circuitry 1001 may be implemented as an alternative to the test circuitry 901. The one or more flip-flops 1002 . . . 1003 have reset and/or set inputs that can be selectively driven by a local reset source (providing a local reset signal identified as "func_local_rst_n") or a global reset source (providing a global reset signal identified as "ipt_global_init_n"). The flip-flops 1002 . . . 1003 may be functional flip-flops implemented within the IC 200. A reset synchronizer includes the flip-flops 1030 and 1031 configured to drive the reset or set inputs of one or more of the flip-flops 1002 . . . 1003 via a logic OR gate 1011. The output of the logic OR gate 1011 (identified as "rst_an") is coupled to the reset or set asynchronous inputs of the one or more flip-flops 1002 . . . 1003. In this embodiment, test circuitry 1001 is incorporated with the reset synchronizer in accordance with embodiments of the present disclosure.

The test circuitry 1001 includes an OR-AND-OR logic circuit 1005 coupled to the reset synchronizer. The first logic OR gate of the OR-AND-OR logic circuit 1005 receives the local reset signal "func_local_rst_n" and a local reset disable signal (identified as "tcb_local_reset_disable"). The local reset disable signal may be a selectively generated test signal configured to disable the effect of the local reset signal. The local reset disable signal may be generated by the test control block implemented within the IC 200. The output of the first logic OR gate is received by an input of the logic AND gate of the OR-AND-OR logic circuit 1005, which also receives the global reset signal. The second logic OR gate of the OR-AND-OR logic circuit 1005 receives the output of the logic AND gate along with a global reset disable signal (identified as "tcb_async_disable") configured to selectively disable the effect of the global reset signal. The global reset disable signal may be generated by the test control block implemented within the IC 200. The output of the second logic OR gate is coupled to the reset inputs of the flip-flops 1030 and 1031 of the reset synchronizer. A data input of the flip-flop 1030 of the reset synchronizer is configured to receive, via an inverting buffer 1012, the local reset disable signal.

For testing the logic circuitry that generates the local reset signal (e.g., a functional cone 12), an observe path is implemented by coupling the output of the logic AND gate to an observe flip-flop 1007 implemented to observe the functioning of the local reset signal via an output of the observe flip-flop 1007. An optional logic XOR gate 1006 may be implemented between the output of the logic AND gate and the observe flip-flop 1007 with feedback of the output of the observe flip-flop 1001 to an input of the logic XOR gate 1006.

Figure 11:
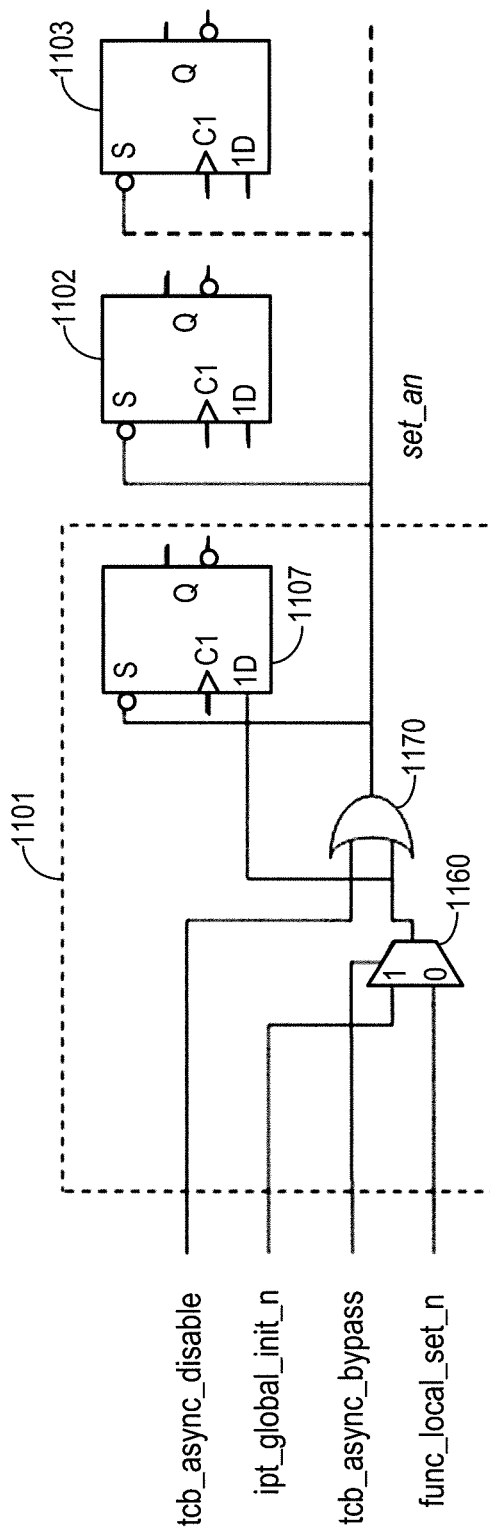
FIG. 11 illustrates test circuitry with an observe flip-flop implemented for synchronously testing a reset path.

FIG. 11 illustrates an embodiment of the present disclosure in which one or more flip-flops 1102 . . . 1103 have reset and/or set inputs that can be selectively driven by a local reset source (providing a local reset signal identified as "func_local_set_n") or a global reset source (providing a global reset signal identified as "ipt_global_init_n"). The flip-flops 1102 . . . 1103 may be functional flip-flops implemented within the IC 200.

In this embodiment, test circuitry 1101 is implemented in accordance with embodiments of the present disclosure. A multiplexer 1160 receives the local reset signal (identified as "func_local_set_n"), which may be driven by a local reset source, and a global reset signal (identified as "ipt_global_init_n"). The multiplexer 1160 is configured to select between these two inputs by a test control signal (identified as "tcb_async_bypass"), which may be generated by the test control block implemented within the IC 200. The output of the multiplexer 1160 is received by a logic OR gate 1170, which also receives a global reset disable signal (identified as "tcb_async_disable") configured to selectively disable the effect of the global reset signal. The output of the logic OR gate 1170 (identified as "set_an") is coupled to the reset or set asynchronous inputs of the one or more flip-flops 1102 . . . 1103. For testing the logic circuitry that generates the local reset signal (e.g., a functional cone 12), an observe path is implemented by coupling the output of the multiplexer 1160 to a data input of an observe flip-flop 1107 implemented to observe the functioning of the local reset signal via an output of the observe flip-flop 1107. An optional set or reset input of the observe flip-flop 1107 is coupled to the output of the logic OR gate 1170. Note that the observe flip-flop 1107 may be configured similarly as the observe flip-flop 1007 with a logic XOR gate for feedback from the output of the flip-flop 1007.

Figure 12:
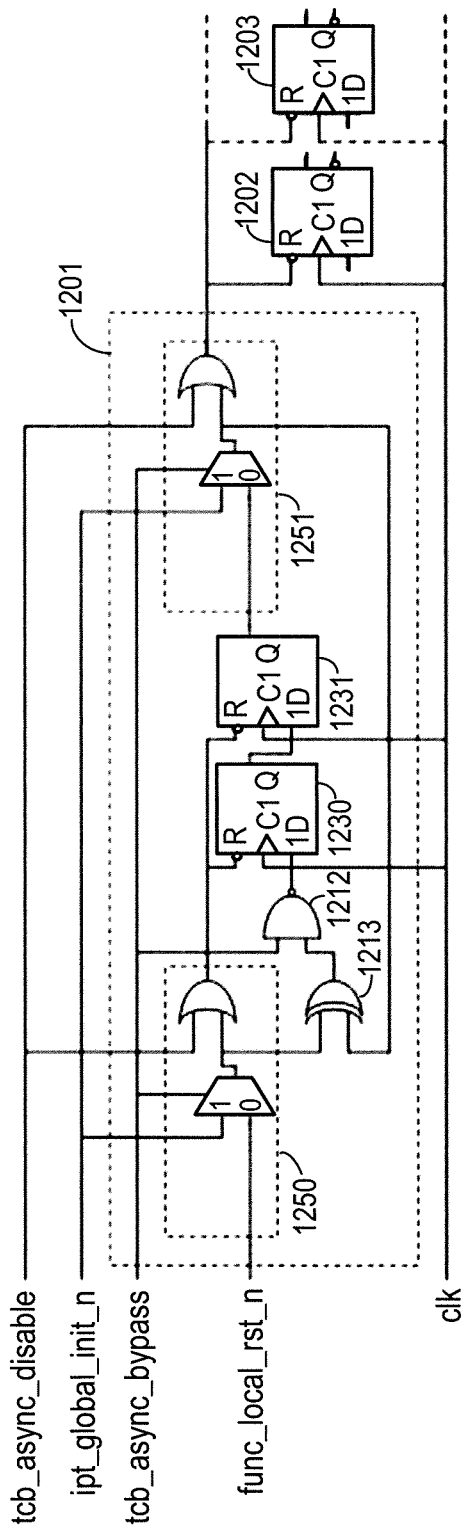
FIG. 12 illustrates test circuitry for implementation with a reset synchronizer with an observation path for synchronously testing a reset path via reuse of a functional flip-flop.

FIG. 12 illustrates an embodiment of the present disclosure in which one or more flip-flops 1202 . . . 1203 have reset and/or set inputs that can be selectively driven by a local reset source (providing a local reset signal identified as "func_local_rst_n") or a global reset source (providing a global reset signal identified as "ipt_global_init_n"). The flip-flops 1202 . . . 1203 may be functional flip-flops implemented within the IC 200. The embodiment of FIG. 12 is similar to the embodiment of FIG. 11 except that it is implemented for use with a reset synchronizer. The reset synchronizer includes the flip-flops 1230 and 1231 configured to drive the reset or set inputs of one or more of the flip-flops 1202 . . . 1203 via the logic circuit 1251. In this embodiment, test circuitry 1201 is incorporated with the reset synchronizer in accordance with embodiments of the present disclosure.

The logic circuits 1250 and 1251 may be similar to the configuration of the multiplexer 1160 and the logic OR gate 1170 of FIG. 11. A first input of the multiplexer of the logic circuit 1250 receives the local reset signal (identified as "func_local_rst_n"), which may be driven by a local reset source. A second input of the multiplexer of the logic circuit 1250 receives a global reset signal (identified as "ipt_global_init_n"). The multiplexer of the logic circuit 1250 is configured to select between these two inputs by a test control signal (identified as "tcb_async_bypass"), which may be generated by the test control block implemented within the IC 200. The output of the multiplexer of the logic circuit 1250 is received by a logic OR gate of the logic circuit 1250, which also receives a global reset disable signal (identified as "tcb_async_disable") configured to selectively disable the effect of the global reset signal. The output of the logic OR gate of the logic circuit 1250 is coupled to the reset inputs of the flip-flops 1230 and 1231 of the reset synchronizer.

A first input of the multiplexer of the logic circuit 1251 receives the output of the flip-flop 1231. A second input of the multiplexer of the logic circuit 1251 receives the global reset signal. The multiplexer of the logic circuit 1251 is configured to select between these two inputs by the test control signal, tcb_async_bypass. The output of the multiplexer of the logic circuit 1251 is received by a logic OR gate of the logic circuit 1251, which also receives the global reset disable signal, tcb_async_disable. The output of the logic OR gate of the logic circuit 1251 is coupled to the reset and/or set inputs of the one or more flip-flops 1202 . . . 1203.

In the embodiments described herein implementing an observe flip-flop (e.g., observe flip-flops 507, 707, 1007, 1107), the outputs of such observe flip-flops may be coupled to other flip-flops (e.g., any of the other flip-flops shown in the various embodiments of FIGS. 4-7 and 9-12) in a scan chain implemented for synchronous scan testing.

Referring to FIG. 13, systems, methods, processes, and circuitry will now be described for how the test circuits disclosed with respect to FIGS. 4-7 and 9-12 may be implemented in accordance with embodiments of the present disclosure. The Modes of operation listed in Table 1300 of FIG. 13 are applicable to each of the embodiments disclosed with respect to FIGS. 4-7 and 9-12.

In Table 1300, an "F" indicates that the signal originates from a scan flip-flop (not shown) implemented within the IC 200, which may be in control by the test controller 201 (e.g., an ATPG). A "P" indicates a pulsed clock implemented within the IC 200. A dash ("-") indicates a "do not care" signal. "Pin se" represents an input pin (not shown) to the IC 200 in which the scan enable signal (tcb_se) may be input during scan operations (shift and capture). This may be a test data in ("TDI") pin (or the pin that is used as TDI during test). "Pin ad" represents an input pin (not shown) to the IC 200 in which the tcb_async_disable, tcb_async_set_disable, and/or tcb_async_rst_disable signals may be input during a scan asynchronous test. A test mode select ("TMS") pin (not shown) may be used for this when Pin tck is not pulsed in the normal cycle and the dead cycles. In Table 1300, it is assumed that Pin ad is free during a scan shift operation. The label "clk" represents a placeholder for all functional clock signals supplied to the functional flip-flops (e.g., see the flip-flops 402 . . . 403, 502 . . . 503, 602 . . . 603, 702 . . . 703, 802 . . . 803, 902 . . . 903, 1002 . . . 1003, 1102 . . . 1103, and 1202 . . . 1203), which may be driven by Pin tck during a scan shift operation. In the capture cycle of a synchronous scan test, they may be driven either by Pin tck or by a functional clock source. The global reset signal (identified in Table 1300 as "ipt_global_init_an" but also refers to the signals identified herein as "ipt_global_init_set_an" and "ipt_global_init_rst_an") may be implemented in the IC 200 solely for testing as described herein, and thus may originate from an ATPG controlled source (e.g., within the test controller 201), such as either an input pin of the IC 200 or a scan flip-flop implemented within the IC 200. Or, the global reset signal may be a signal implemented within the IC 200 for normal application processes, in which it may be coupled to the test circuitry in accordance with embodiments of the present disclosure (e.g., configured to be selectively controllable by the test controller 201).

The Modes of operation listed in Table 1300 demonstrate how the test circuitry disclosed with respect to FIGS. 4-7 and 9-12 may be configured to perform a combination of tests (e.g., under control of the test controller 201) that are not susceptible to degradation due to glitches. As previously disclosed, the signals beginning with the prefix "tcb_" may originate from one or more test control blocks ("TCBs"), with scan capability when needed (i.e., "F" mode used). Therefore, it can be readily seen that Table 1300 represents how such TCB(s) may be configured to convey the various test signals for performing the test sequences described herein utilizing the various embodiments of the test circuitry described with respect to FIGS. 4-7 and 9-12.

During one of the test sequences (e.g., the SCAN Mode), one or more synchronous scan tests are performed on the logic circuitry that generates (and delivers to one or more flip-flops) local reset signal(s) (such logic circuitry referred to herein as the local reset source, e.g., a functional cone 12), while disabling delivery of any set or reset signal(s) to the asynchronous input(s) of any flip-flops that have such asynchronous input(s) configured to selectively receive such a local reset signal. The test circuitry may include circuitry configured to observe results of the one or more synchronous scan tests.

In another test sequence (e.g., the SCAN ASYNC Mode), the asynchronous behaviour of the flip-flops is tested using a global reset signal. During this test sequence, the test circuitry establishes a single path for propagation of the global reset signal to the flip-flops, which guarantees the absence of glitches. During this test sequence, delivery of the local reset signal(s) to the flip-flops is disabled.

In accordance with embodiments of the present disclosure, the foregoing tests sequences (e.g., the SCAN and SCAN ASYNC Modes) may be performed in any order. Furthermore, the foregoing test sequences may be performed by any suitable test equipment, software, or circuitry, including external test equipment (e.g., the test controller 201 of FIG. 1), or suitable hardware/software implemented within the IC 200.

Table 1300 illustrates an APPLICATION Mode representing operation of the IC 200 during normal operation, i.e., the synchronous (SCAN Mode) and asynchronous (SCAN ASYNC Mode) tests are not being performed. During the APPLICATION Mode, control signals from the TCB(s) may be asserted as logic 0 signals, while the other signals may be determined by the various functional operations of the circuitry within the IC 200. In cases where the global reset signal is not used functionally, it may be disabled during the APPLICATION Mode.

The SCAN Mode in Table 1300 represents performance of a synchronous scan test, which may be implemented within the IC 200 in accordance with well-known circuitry, and may be performed by the test controller 201 in accordance with well-known procedures, but as modified in accordance with embodiments of the present disclosure. During all of the cycles of the SCAN Mode (including the Shift and Capture cycles), the delivery of asynchronous set or reset signals to the flip-flops (e.g., see the flip-flops 402 . . . 403, 502 . . . 503, 602 . . . 603, 702 . . . 703, 802 . . . 803, 902 . . . 903, 1002 . . . 1003, 1102 . . . 1103, and 1202 . . . 1203) is disabled. This may be performed by asserting the global reset disable signal, which is identified in the various embodiments of FIGS. 4-7 and 9-12 as either "tcb_async_disable," "tcb_async_set_disable," or "tcb_async_rst_disable." For example, as can be seen in the test circuitry 401 of FIG. 4, assertion of the tcb_async_disable signal will result in the disabling of any asynchronous inputs into the one or more flip-flops 402 . . . 403 (e.g., the global reset signal, ipt_global_init_n, and the local reset signal, func_local_rst_set_n, are masked from being able to asynchronously set or reset any of the one or more flip-flops 402 . . . 403). The test circuitry pertaining to the embodiments of FIGS. 5-7 and 9-12 may operate in a similar manner during the SCAN Mode to mask delivery of any set or reset signals to the flip-flops.

As described with respect to FIGS. 4-7 and 9-12, the various test circuitry within these embodiments implements an observe path configured to permit results of the synchronous scan tests to be observed (e.g., by the test controller 201 via a TCB).

The SCAN ASYNC Mode in Table 1300 represents performance of an asynchronous scan test, which may be implemented within the IC 200 in accordance with well-known circuitry, and may be performed by the test controller 201 in accordance with well-known procedures, but as modified in accordance with embodiments of the present disclosure. During the Capture cycle of the SCAN ASYNC Mode, delivery of any asynchronous set or reset signals from the local reset source to the flip-flops is disabled. This may be performed by asserting the local reset disable signal, which is identified in the various embodiments of FIGS. 4-7 and 9-12 as either "tcb_local_reset_disable" or "tcb_async_bypass." For example, as can be seen in the test circuitry 401 of FIG. 4, assertion of the tcb_local_reset_disable signal effectively results in the disabling (i.e., masking) of the local reset signal, func_local_rst_set_n, into the one or more flip-flops 402 . . . 403 in favor of the value of the global reset signal. The test circuitry pertaining to the embodiments of FIGS. 5-7 and 9-12 may operate in a similar manner during the SCAN ASYNC Mode to mask delivery of any local set or reset signals to the flip-flops. Note that no active clock is applied to the one or more flip-flops during the Capture cycle of the SCAN ASYNC Mode.

In Table 1300, "dead cycle shift" refers to a cycle (time period) performed during a synchronous scan operation in which signal conditions equal the shift condition, clock signals are off, and asynchronous set/resets are deasserted. "Dead cycle normal" refers to a cycle (time period) performed during a synchronous scan operation in which signal conditions equal the capture condition, clock signals are off, and asynchronous set/resets are deasserted. "Normal/capture" refers to a cycle (time period) performed during a synchronous scan operation in which signal conditions equal the capture conditions including test conditions for clock signals and asynchronous set/resets.

It can be readily appreciated how the embodiments illustrated in FIGS. 5-7 and 9-12 will operate when the signals designated in Table 1300 are applied.

Embodiments of the present disclosure are not limited to the multiplexers, logic AND gates, logic OR gates, logic XOR gates, logic NAND gates, and logic buffers shown in the above embodiments. Other logic circuits, generating equivalent logic relationships, may be employed instead.

Figure 14:
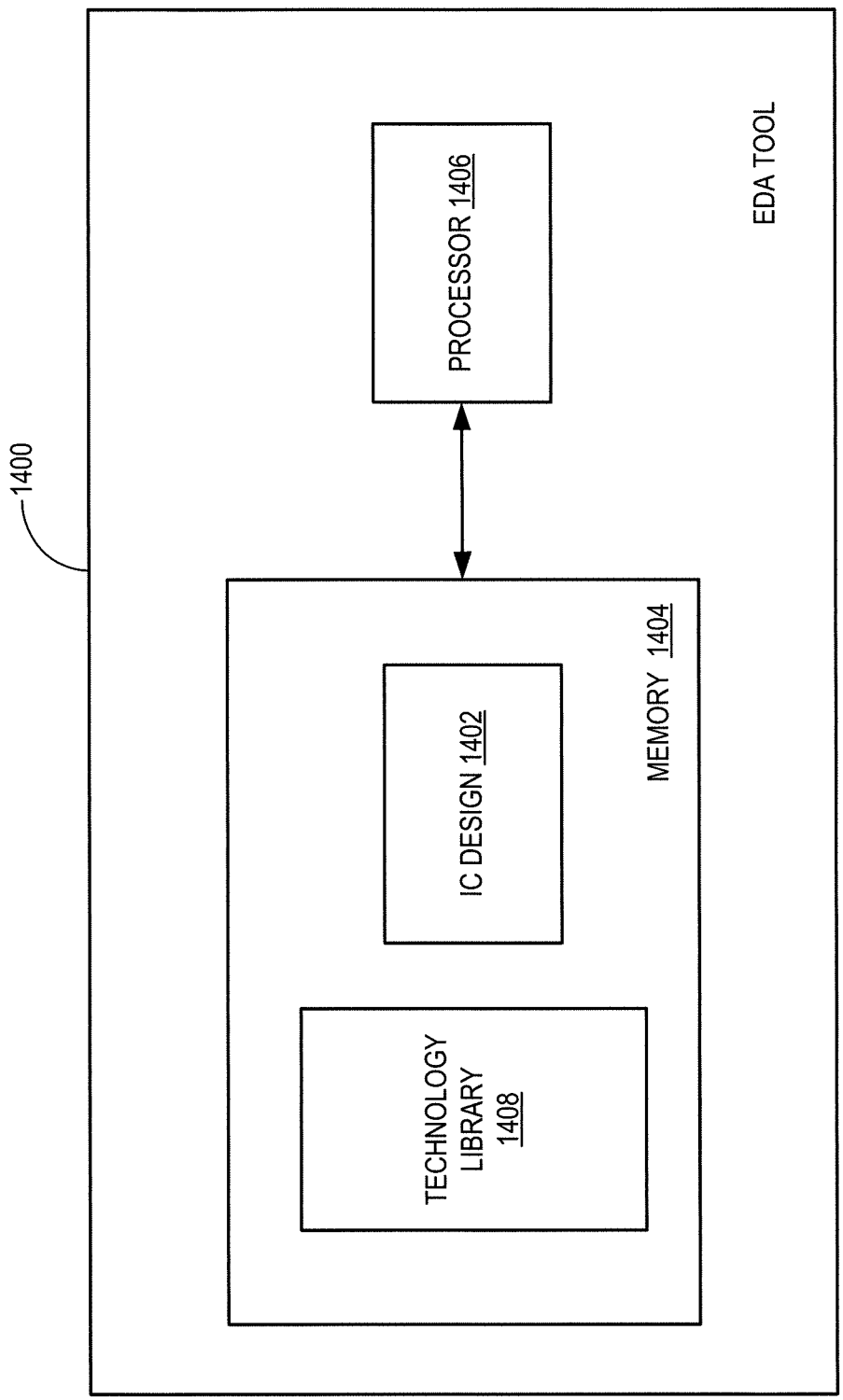
FIG. 14 illustrates a schematic block diagram of an electronic design automation ("EDA") tool in accordance with embodiments of the present disclosure.

Referring now to FIG. 14, a schematic block diagram of an electronic design automation ("EDA") tool 1400 for increasing the fault coverage of an integrated circuit ("IC") design 1402 (e.g., a design of the IC 200 of FIG. 2) in accordance with embodiments of the present disclosure is illustrated. The EDA tool 1400 includes a memory 1404 and a processor 1406 in communication with the memory 1404. The memory 1404 may include a technology library 1408. The memory 1404 receives and stores the IC design 1402. The IC design 1402 may include any circuit design that includes digital logic elements, digital memory elements, or a combination thereof. Examples of digital logic elements include a logic AND gate, a logic OR gate, a logic NOT gate, a logic NOR gate, a logic NAND gate, a logic XOR gate, a logic XNOR gate, a multiplexer, and a demultiplexer, and/or combinational logic circuitry that includes a combination of the above-mentioned gates. Examples of digital memory elements include a flip-flop, a latch, and a shift-register. The technology library 1408 stores instances of the digital memory elements and digital logic elements.

The processor 1406 and the memory 1404 include a computer system that can range from a stand-alone personal computer to a network of processors and memories, to a mainframe system. The computer system includes verification tools that can simulate digital and analog circuits, such as Incisive™ Unified Simulator ("IUS") by Cadence Design Systems, Inc. Such tools and computer systems are known to those of skill in the art. Examples of the IC design 1402 include microprocessor, microcontroller unit ("MCU"), system-on-chip ("SOC"), and application specific IC ("ASIC") designs.

The EDA tool 1400 is used to modify the IC design 1402 for increasing the fault coverage of the IC design 1402. In operation, the processor 1406 identifies each functional flip-flop in the IC design that includes an asynchronous input coupled to an asynchronous local reset signal source, with or without a reset synchronizer (e.g., the flip-flops 402 . . . 403, 502 . . . 503, 602 . . . 603, 702 . . . 703, 902 . . . 903, 1002 . . . 1003, 1102 . . . 1103, 1202 . . . 1203). The processor 1406 then inserts, for each of the identified functional flip-flops, a scan test circuit between the asynchronous local reset signal source and the functional flip-flop, wherein the scan test circuit may be configured as disclosed herein with respect to any of FIGS. 4-7 and 9-13.

Aspects of the present disclosure provide an integrated circuit including a flip-flop configured to be asynchronously set or reset via an asynchronous input; circuitry configured to selectively deliver an asynchronous global reset signal; logic circuitry having an output, wherein the logic circuitry is configured to selectively deliver a local reset signal via the output to the asynchronous input of the flip-flop; and test circuitry with a first input coupled to the circuitry configured to selectively deliver the asynchronous global reset signal, and a second input coupled to the output of the logic circuitry, wherein the test circuitry is configured to perform a synchronous scan test of functioning of delivery of the local reset signal from the output of the logic circuitry while masking delivery of any reset signal to the asynchronous input of the flip-flop, and wherein the test circuitry is configured to perform an asynchronous scan test of an asynchronous reset of the flip-flop with the asynchronous global reset signal while masking delivery of the local reset signal to the asynchronous input of the flip-flop. The test circuitry may further include observe path circuitry configured to observe a result of the synchronous scan test of functioning of delivery of the local reset signal from the output of the logic circuitry. The observe path circuitry may include a multiplexer with an output coupled to a data input of the flip-flop, wherein a first input of the multiplexer is configured to receive the local reset signal as a function of receipt of an observe enable signal. The observe path circuitry may include an observe flip-flop operatively coupled to the output of the logic circuitry. The test circuitry may include a first logic OR gate with a first input coupled to the output of the logic circuitry, and a second input configured to receive a first selectively generated test signal; a logic AND gate with a first input coupled to an output of the first logic OR gate, and a second input coupled to the circuitry configured to selectively deliver the asynchronous global reset signal; and a second logic OR gate with a first input coupled to an output of the logic AND gate, and a second input configured to receive a second selectively generated test signal, wherein an output of the second logic OR gate is coupled to the asynchronous input of the flip-flop. The test circuitry may include a multiplexer with a first input coupled to an output of the logic AND gate, and a second input coupled to a data input path to the flip-flop, wherein the multiplexer is configured to couple the output from the logic AND gate to a data input of the flip-flop as a function of a selectively generated observe enable signal during performance of the synchronous scan test. The integrated circuit may further include an observe flip-flop with a data input coupled to an output of the logic AND gate. The flip-flop may include an asynchronous set input and an asynchronous reset input, wherein the circuitry configured to selectively deliver an asynchronous global reset signal may include global set circuitry configured to selectively deliver an asynchronous global set signal; and global reset circuitry configured to selectively deliver an asynchronous global reset signal; wherein the logic circuitry may include a first combinatorial logic circuit configured to selectively deliver a local set signal to the asynchronous set input of the flip-flop, and a second combinatorial logic circuit configured to selectively deliver a local reset signal to the asynchronous reset input of the flip-flop; and wherein the test circuitry may include a first logic OR gate with a first input coupled to an output of the first combinatorial logic circuit, and a second input configured to receive a first generated test signal configured to selectively mask delivery of the local set signal to the flip-flop; a first logic AND gate with a first input coupled to an output of the first logic OR gate, and a second input coupled to the global set circuitry configured to selectively deliver the asynchronous global set signal; a second logic OR gate with a first input coupled to an output of the first logic AND gate, and a second input configured to receive a second generated test signal configured to selectively mask delivery of the global set signal to the flip-flop, wherein an output of the second logic OR gate is coupled to the asynchronous set input of the flip-flop; a third logic OR gate with a first input coupled to an output of the second combinatorial logic circuit, and a second input configured to receive a third generated test signal configured to selectively mask delivery of the local reset signal to the flip-flop; a second logic AND gate with a first input coupled to an output of the third logic OR gate, and a second input coupled to the global reset circuitry configured to selectively deliver the asynchronous global reset signal; a fourth logic OR gate with a first input coupled to an output of the second logic AND gate, and a second input configured to receive a fourth generated test signal configured to selectively mask delivery of the global reset signal to the flip-flop, wherein an output of the fourth logic OR gate is coupled to the asynchronous reset input of the flip-flop; a logic XOR gate with a first input coupled to the output of the first logic AND gate, and a second input coupled to the output of the second logic AND gate; and observe path circuitry configured to observe a result of the synchronous scan test. The integrated circuit may include a logic NAND gate with a first input coupled to the output of the logic AND gate, and a second input configured to receive a selectively generated observe enable signal during performance of the synchronous scan test; a reset synchronizer with a reset input coupled to the output of the second logic OR gate, and a data input coupled to an output of the logic NAND gate; and a third logic OR gate with a first input coupled to an output of the reset synchronizer, and a second input configured to receive the second generated test signal. The integrated circuit may further include a reset synchronizer with a reset input coupled to the output of the second logic OR gate, and a data input configured to receive an inverted version of the first generated test signal; a third logic OR gate with a first input coupled to an output of the reset synchronizer, and a second input configured to receive the second generated test signal; a logic XOR gate with a first input coupled to the output of the logic AND gate; and an observe flip-flop with a data input coupled to an output of the logic XOR gate, wherein a data output of the observe flip-flop is coupled to a second input of the logic XOR gate. The test circuitry may include a multiplexer with a first input coupled to the output of the logic circuitry, and a second input coupled to the circuitry configured to selectively deliver the asynchronous global reset signal, wherein the multiplexer is configured to select from the first and second inputs as a function of a receipt of a first selectively generated test signal; a logic OR gate with a first input coupled to the output of the multiplexer, and a second input configured to receive a second selectively generated test signal, wherein an output of the logic OR gate is coupled to the asynchronous input of the flip-flop; and an observe flip-flop with an asynchronous set input coupled to an output of the logic OR gate, and a data input coupled to the output of the multiplexer. The test circuitry may include a first multiplexer with a first input coupled to the output of the logic circuitry, and a second input coupled to the circuitry configured to selectively deliver the asynchronous global reset signal, wherein the first multiplexer is configured to select from the first and second inputs as a function of a receipt of a first selectively generated test signal; a first logic OR gate with a first input coupled to the output of the first multiplexer, and a second input configured to receive a second selectively generated test signal; a second multiplexer with a first input, and a second input coupled to the circuitry configured to selectively deliver the asynchronous global reset signal, wherein the second multiplexer is configured to select from the first and second inputs as a function of a receipt of the first selectively generated test signal; a second logic OR gate with a first input coupled to the output of the second multiplexer, and a second input configured to receive the second selectively generated test signal, wherein an output of the second logic OR gate is coupled to the asynchronous input of the flip-flop; and wherein the integrated circuit may further include a logic XOR gate with a first input coupled to an output of the first multiplexer, and a second input coupled to an output of the second multiplexer; a logic NAND gate with a first input coupled to an output of the logic XOR gate, and a second input configured to receive the first selectively generated test signal; a reset synchronizer with a reset input coupled to the output of the first logic OR gate, and a data input coupled to an output of the logic NAND gate, wherein an output of the reset synchronizer is coupled to the first input of the second multiplexer. The logic circuitry may be configured to deliver the local reset signal independent of an assertion of the asynchronous global reset signal, wherein the logic circuitry is configured to deliver the local reset signal only to the flip-flop, and wherein the asynchronous global reset signal is also configured for delivery to logic circuits in the integrated circuit other than the flip-flop.

An aspect of the present disclosure provides a method or process for testing integrated circuitry, wherein the integrated circuitry may include a flip-flop with an asynchronous input, circuitry configured to selectively deliver an asynchronous global reset signal to the asynchronous input of the flip-flop, and a functional cone configured to selectively deliver a local reset signal to the asynchronous input of the flip-flop. The method includes performing a synchronous scan test of delivery of the local reset signal from an output of the functional cone while masking delivery of any reset signal to the asynchronous input of the flip-flop, and performing an asynchronous scan test of an asynchronous reset of the flip-flop with the asynchronous global reset signal while masking delivery of the local reset signal to the asynchronous input of the flip-flop. The integrated circuitry may include a scan test circuit coupled between the functional cone and the flip-flop, and a test controller configured to perform the synchronous scan test and the asynchronous scan test independent of each other, wherein the scan test circuit may include circuitry configured to enable the test controller to observe a result of the synchronous scan test. The performing of the synchronous scan test may include sending a first set of test control signals to the scan test circuit to mask delivery of the asynchronous global reset signal and the local reset signal to the asynchronous input of the flip-flop, and the performing of the asynchronous scan test may include sending a second set of test control signals to the scan test circuit to enable delivery of the asynchronous global reset signal to the asynchronous input of the flip-flop while masking delivery of the local reset signal to the asynchronous input of the flip-flop. The method may further include observing, by the test controller, a result of the synchronous scan test via a signal generated within the scan test circuit.

An aspect of the present disclosure provides an electronic design automation ("EDA") tool for increasing the fault coverage of an integrated circuit ("IC") design, wherein the EDA tool includes a memory that stores the IC design, and a processor in communication with the memory, wherein the processor may include circuitry for identifying each functional flip-flop in the IC design that may include an asynchronous input coupled to an asynchronous local reset signal source, and circuitry for inserting, for each of the identified functional flip-flops, a scan test circuit between the asynchronous local reset signal source and the functional flip-flop. The scan test circuit may include an input coupled to the asynchronous global reset signal source; an input coupled to the asynchronous local reset signal source; test control inputs coupled to a test control block ("TCB"), wherein the test control inputs are configured to receive a first set of TCB control signals configured to mask delivery of any asynchronous reset signal to the asynchronous input of the functional flip-flop during performance of a synchronous scan test of the asynchronous local reset signal source, wherein the test control inputs are configured to receive a second set of TCB control signals configured to mask delivery of a reset signal from the asynchronous local reset signal source to the asynchronous input of the functional flip-flop while enabling delivery of a reset signal from the asynchronous global reset signal source to the asynchronous input of the functional flip-flop during performance of an asynchronous scan test; and an observation point configured to enable observation of a result of the synchronous scan test. The scan test circuit may include a first logic OR gate with a first input coupled to the asynchronous local reset signal source, and a second input coupled to a first one of the test control inputs, a logic AND gate with a first input coupled to an output of the first logic OR gate, and a second input coupled to the asynchronous global reset signal source, and a second logic OR gate with a first input coupled to an output of the logic AND gate, and a second input coupled to a second one of the test control inputs, wherein an output of the second logic OR gate is coupled to the asynchronous input of the flip-flop. The observation point may be a data output of the functional flip-flop. The scan test circuit may include a multiplexer with a first input coupled to an output of the logic AND gate, and a second input coupled to a data input path to the functional flip-flop, and wherein the multiplexer is configured to couple the output from the logic AND gate to a data input of the functional flip-flop as a function of a one of the first set of TCB control signals during performance of the synchronous scan test to thereby provide an observation signal from the observation point. The scan test circuit may include an observe flip-flop with a data input coupled to an output of the logic AND gate, wherein the observation point is a data output of the observe flip-flop.

As used herein, the term "and/or" when used in the context of a listing of entities, refers to the entities being present singly or in combination. Thus, for example, the phrase "A, B, C, and/or D" includes A, B, C, and D individually, but also includes any and all combinations and subcombinations of A, B, C, and D. As used herein, a series of numbers linked by an ellipsis (" . . . ") means that the embodiment may be implemented with one or more of the elements identified by the series of numbers. As used herein, the terms "a" and "an" mean "one or more" when used in this disclosure, including the claims.

What is claimed is:

1. An integrated circuit comprising:
a flip-flop configured to be asynchronously set or reset via an asynchronous input;
circuitry configured to selectively deliver an asynchronous global reset signal;
logic circuitry having an output, wherein the logic circuitry is configured to selectively deliver a local reset signal via the output to the asynchronous input of the flip-flop; and
test circuitry with a first input coupled to the circuitry configured to selectively deliver the asynchronous global reset signal, and a second input coupled to the output of the logic circuitry,
wherein the test circuitry is configured to perform a synchronous scan test of functioning of delivery of the local reset signal from the output of the logic circuitry while masking delivery of any reset signal to the asynchronous input of the flip-flop, and
wherein the test circuitry is configured to perform an asynchronous scan test of an asynchronous reset of the flip-flop with the asynchronous global reset signal while masking delivery of the local reset signal to the asynchronous input of the flip-flop.

2. The integrated circuit as recited in claim 1, wherein the test circuitry comprises observe path circuitry configured to observe a result of the synchronous scan test of functioning of delivery of the local reset signal from the output of the logic circuitry.

3. The integrated circuit as recited in claim 2, wherein the observe path circuitry comprises a multiplexer with an output coupled to a data input of the flip-flop, wherein a first input of the multiplexer is configured to receive the local reset signal as a function of receipt of an observe enable signal.

4. The integrated circuit as recited in claim 2, wherein the observe path circuitry comprises an observe flip-flop operatively coupled to the output of the logic circuitry.

5. The integrated circuit as recited in claim 1, wherein the test circuitry comprises:
a first logic OR gate with a first input coupled to the output of the logic circuitry, and a second input configured to receive a first selectively generated test signal;
a logic AND gate with a first input coupled to an output of the first logic OR gate, and a second input coupled to the circuitry configured to selectively deliver the asynchronous global reset signal; and
a second logic OR gate with a first input coupled to an output of the logic AND gate, and a second input configured to receive a second selectively generated test signal, wherein an output of the second logic OR gate is coupled to the asynchronous input of the flip-flop.

6. The integrated circuit as recited in claim 5, wherein the test circuitry comprises a multiplexer with a first input coupled to an output of the logic AND gate, and a second input coupled to a data input path to the flip-flop, and wherein the multiplexer is configured to couple the output from the logic AND gate to a data input of the flip-flop as a function of a selectively generated observe enable signal during performance of the synchronous scan test.

7. The integrated circuit as recited in claim 5, further comprising an observe flip-flop with a data input coupled to an output of the logic AND gate.

8. The integrated circuit as recited in claim 5, further comprising:
a logic NAND gate with a first input coupled to the output of the logic AND gate, and a second input configured to receive a selectively generated observe enable signal during performance of the synchronous scan test;
a reset synchronizer with a reset input coupled to the output of the second logic OR gate, and a data input coupled to an output of the logic NAND gate; and
a third logic OR gate with a first input coupled to an output of the reset synchronizer, and a second input configured to receive the second generated test signal.

9. The integrated circuit as recited in claim 5, further comprising:
a reset synchronizer with a reset input coupled to the output of the second logic OR gate, and a data input configured to receive an inverted version of the first generated test signal;

a third logic OR gate with a first input coupled to an output of the reset synchronizer, and a second input configured to receive the second generated test signal;
a logic XOR gate with a first input coupled to the output of the logic AND gate; and
an observe flip-flop with a data input coupled to an output of the logic XOR gate, wherein a data output of the observe flip-flop is coupled to a second input of the logic XOR gate.

10. The integrated circuit as recited in claim 1, wherein the flip-flop comprises an asynchronous set input and an asynchronous reset input, and wherein the circuitry configured to selectively deliver an asynchronous global reset signal comprises:
global set circuitry configured to selectively deliver an asynchronous global set signal; and
global reset circuitry configured to selectively deliver an asynchronous global reset signal, and
wherein the logic circuitry comprises:
a first combinatorial logic circuit configured to selectively deliver a local set signal to the asynchronous set input of the flip-flop; and
a second combinatorial logic circuit configured to selectively deliver a local reset signal to the asynchronous reset input of the flip-flop, and
wherein the test circuitry comprises:
a first logic OR gate with a first input coupled to an output of the first combinatorial logic circuit, and a second input configured to receive a first generated test signal configured to selectively mask delivery of the local set signal to the flip-flop;
a first logic AND gate with a first input coupled to an output of the first logic OR gate, and a second input coupled to the global set circuitry configured to selectively deliver the asynchronous global set signal;
a second logic OR gate with a first input coupled to an output of the first logic AND gate, and a second input configured to receive a second generated test signal configured to selectively mask delivery of the global set signal to the flip-flop, wherein an output of the second logic OR gate is coupled to the asynchronous set input of the flip-flop;
a third logic OR gate with a first input coupled to an output of the second combinatorial logic circuit, and a second input configured to receive a third generated test signal configured to selectively mask delivery of the local reset signal to the flip-flop;
a second logic AND gate with a first input coupled to an output of the third logic OR gate, and a second input coupled to the global reset circuitry configured to selectively deliver the asynchronous global reset signal;
a fourth logic OR gate with a first input coupled to an output of the second logic AND gate, and a second input configured to receive a fourth generated test signal configured to selectively mask delivery of the global reset signal to the flip-flop, wherein an output of the fourth logic OR gate is coupled to the asynchronous reset input of the flip-flop;
a logic XOR gate with a first input coupled to the output of the first logic AND gate, and a second input coupled to the output of the second logic AND gate; and
observe path circuitry configured to observe a result of the synchronous scan test.

11. The integrated circuit as recited in claim 1, wherein the test circuitry comprises:

a multiplexer with a first input coupled to the output of the logic circuitry, and a second input coupled to the circuitry configured to selectively deliver the asynchronous global reset signal, wherein the multiplexer is configured to select from the first and second inputs as a function of a receipt of a first selectively generated test signal;

a logic OR gate with a first input coupled to the output of the multiplexer, and a second input configured to receive a second selectively generated test signal, wherein an output of the logic OR gate is coupled to the asynchronous input of the flip-flop; and an observe flip-flop with an asynchronous set input coupled to an output of the logic OR gate, and a data input coupled to the output of the multiplexer.

12. The integrated circuit as recited in claim 1, wherein the test circuitry comprises:

a first multiplexer with a first input coupled to the output of the logic circuitry, and a second input coupled to the circuitry configured to selectively deliver the asynchronous global reset signal, wherein the first multiplexer is configured to select from the first and second inputs as a function of a receipt of a first selectively generated test signal;

a first logic OR gate with a first input coupled to the output of the first multiplexer, and a second input configured to receive a second selectively generated test signal;

a second multiplexer with a first input, and a second input coupled to the circuitry configured to selectively deliver the asynchronous global reset signal, wherein the second multiplexer is configured to select from the first and second inputs as a function of a receipt of the first selectively generated test signal;

a second logic OR gate with a first input coupled to the output of the second multiplexer, and a second input configured to receive the second selectively generated test signal, wherein an output of the second logic OR gate is coupled to the asynchronous input of the flip-flop, the integrated circuit further comprising:

a logic XOR gate with a first input coupled to an output of the first multiplexer, and a second input coupled to an output of the second multiplexer;

a logic NAND gate with a first input coupled to an output of the logic XOR gate, and a second input configured to receive the first selectively generated test signal;

a reset synchronizer with a reset input coupled to the output of the first logic OR gate, and a data input coupled to an output of the logic NAND gate, wherein an output of the reset synchronizer is coupled to the first input of the second multiplexer.

13. The integrated circuit as recited in claim 1, wherein the logic circuitry is configured to deliver the local reset signal independent of an assertion of the asynchronous global reset signal, wherein the logic circuitry is configured to deliver the local reset signal only to the flip-flop, and wherein the asynchronous global reset signal is also configured for delivery to logic circuits in the integrated circuit other than the flip-flop.

14. A method for testing integrated circuitry, wherein the integrated circuitry comprises a flip-flop with an asynchronous input, circuitry configured to selectively deliver an asynchronous global reset signal to the asynchronous input of the flip-flop, and a functional cone configured to selectively deliver a local reset signal to the asynchronous input of the flip-flop, the method comprising:

performing a synchronous scan test of delivery of the local reset signal from an output of the functional cone while masking delivery of any reset signal to the asynchronous input of the flip-flop; and performing an asynchronous scan test of an asynchronous reset of the flip-flop with the asynchronous global reset signal while masking delivery of the local reset signal to the asynchronous input of the flip-flop.

15. The method as recited in claim 14, wherein the integrated circuitry comprises a scan test circuit coupled between the functional cone and the flip-flop, and a test controller configured to perform the synchronous scan test and the asynchronous scan test independent of each other, wherein the scan test circuit comprises circuitry configured to enable the test controller to observe a result of the synchronous scan test, wherein the performing of the synchronous scan test comprises sending a first set of test control signals to the scan test circuit to mask delivery of the asynchronous global reset signal and the local reset signal to the asynchronous input of the flip-flop, and wherein the performing of the asynchronous scan test comprises sending a second set of test control signals to the scan test circuit to enable delivery of the asynchronous global reset signal to the asynchronous input of the flip-flop while masking delivery of the local reset signal to the asynchronous input of the flip-flop.

16. The method as recited in claim 15, further comprising observing, by the test controller, a result of the synchronous scan test via a signal generated within the scan test circuit.

17. An electronic design automation ("EDA") tool for increasing the fault coverage of an integrated circuit ("IC") design, the EDA tool comprising:

a memory that stores the IC design; and a processor in communication with the memory, wherein the processor includes:

circuitry for identifying each functional flip-flop in the IC design that includes an asynchronous input coupled to an asynchronous local reset signal source; and circuitry for inserting, for each of the identified functional flip-flops, a scan test circuit between the asynchronous local reset signal source and the functional flip-flop, wherein the scan test circuit comprises:

an input coupled to the asynchronous global reset signal source;

an input coupled to the asynchronous local reset signal source;

test control inputs coupled to a test control block ("TCB"), wherein the test control inputs are configured to receive a first set of TCB control signals configured to mask delivery of any asynchronous reset signal to the asynchronous input of the functional flip-flop during performance of a synchronous scan test of the asynchronous local reset signal source, wherein the test control inputs are configured to receive a second set of TCB control signals configured to mask delivery of a reset signal from the asynchronous local reset signal source to the asynchronous input of the functional flip-flop while enabling delivery of a reset signal from the asynchronous global reset signal source to the asynchronous input of the functional flip-flop during performance of an asynchronous scan test; and an observation point configured to enable observation of a result of the synchronous scan test.

18. The EDA tool as recited in claim 17, wherein the scan test circuit comprises:
- a first logic OR gate with a first input coupled to the asynchronous local reset signal source, and a second input coupled to a first one of the test control inputs;
- a logic AND gate with a first input coupled to an output of the first logic OR gate, and a second input coupled to the asynchronous global reset signal source; and
- a second logic OR gate with a first input coupled to an output of the logic AND gate, and a second input coupled to a second one of the test control inputs, wherein an output of the second logic OR gate is coupled to the asynchronous input of the flip-flop.

19. The EDA tool as recited in claim 18, wherein the observation point is a data output of the functional flip-flop, and wherein the scan test circuit comprises a multiplexer with a first input coupled to an output of the logic AND gate, and a second input coupled to a data input path to the functional flip-flop, and wherein the multiplexer is configured to couple the output from the logic AND gate to a data input of the functional flip-flop as a function of a one of the first set of TCB control signals during performance of the synchronous scan test to thereby provide an observation signal from the observation point.

20. The EDA tool as recited in claim 18, wherein the scan test circuit comprises an observe flip-flop with a data input coupled to an output of the logic AND gate, wherein the observation point is a data output of the observe flip-flop.

* * * * *